(12) United States Patent
Fielding et al.

(10) Patent No.: US 11,158,110 B1
(45) Date of Patent: Oct. 26, 2021

(54) GRAPHICS TEXTURE MAPPING

(71) Applicant: Arm Limited, Cambridge (GB)

(72) Inventors: Edvard Fielding, Trondheim (NO); Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/142,978

(22) Filed: Jan. 6, 2021

(51) Int. Cl.
*G06T 15/04* (2011.01)
*G06T 7/44* (2017.01)
*G06T 15/00* (2011.01)
*G06T 15/80* (2011.01)
*G06T 11/00* (2006.01)

(52) U.S. Cl.
CPC .............. *G06T 15/04* (2013.01); *G06T 7/44* (2017.01)

(58) Field of Classification Search
CPC combination set(s) only.
See application file for complete search history.

(56) References Cited

U.S. PATENT DOCUMENTS

| | | | |
|---|---|---|---|
| 7,271,810 B1 * | 9/2007 | Newhall, Jr. ............ | G06T 15/04 345/582 |
| 7,339,594 B1 * | 3/2008 | Newhall, Jr. ............ | G06T 15/04 345/582 |
| 2003/0234791 A1 * | 12/2003 | Boyd ...................... | G06T 15/04 345/582 |
| 2015/0287232 A1 * | 10/2015 | Cerny ..................... | G06T 15/04 345/501 |

OTHER PUBLICATIONS

Heckbert, "Fundamentals of Texture Mapping and Image Warping," EECS Department University of California, Berkeley, Technical Report No. UCB/CSD-89-516, Jun. 1989 available at: http://www2.eecs.berkeley.edu/Pubs/TechRpts/1989/CSD-89-516.pdf.
McCormack, et al., "Feline: Fast, Elliptical Lines for Anisotropic Texture Mapping," SIGGRAPH '99: Proceedings of the 26th annual conference on Computer graphics and interactive techniques, Jul. 1999 pp. 243-250 available at: https://doi.org/10.1145/311535.311562.
McCormack, et al., "Simple and Table Feline: Fast Elliptical Lines for Anisotropic Texture Mapping," Western Research Library, WRL Research Report 99/1, Oct. 1999 available at: https://www.hpl.hp.com/techreports/Compaq-DEC/WRL-99-1.pdf.
McCormack, et al., "Feline: Fast, Elliptical Lines for Anisotropic Texture Mapping," Powerpoint presentation, Compaq and Mitsubishi Electronic Research Laboratory, Jul. 1999.

* cited by examiner

*Primary Examiner* — Wesner Sajous
(74) *Attorney, Agent, or Firm* — Vierra Magen Marcus LLP

(57) ABSTRACT

When sampling a pair of mipmaps when performing anisotropic filtering when sampling a texture to provide an output sampled texture value for use when rendering an output in a graphics processing system, more positions along an anisotropy direction are sampled in the more detailed mipmap level than in the less detailed mipmap level. Each position that is sampled may have a single sample taken for it, or may be supersampled.

18 Claims, 12 Drawing Sheets

GRAPHICS TEXTURE MAPPING

BACKGROUND

The technology described herein relates to methods of and apparatus for performing texture mapping in graphics processing systems.

It is common in graphics processing systems to generate colours (and other data) for sampling positions in a render output (e.g. an image to be displayed) by applying so-called textures or texture data to the surfaces to be drawn.

A computer graphics texture will typically be configured as an array of texture data elements (texels), each having a corresponding set of texture data (such as colour, luminance and/or light/shadow, etc., values) stored for it. A sampling position in a render output to which the texture is to be applied will then be mapped to a corresponding position in the texture and the texture sampled at that position using an appropriate filtering process (such as a bilinear filtering process), to determine the texture data to be used for the sampling position in the render output.

It is known to store and use graphics textures in the form of "mipmaps", i.e. as sequences (chains) of progressively lower resolution (less detailed) versions of a texture, with each mipmap level being, e.g. half the resolution (half as detailed) as the previous one.

Mipmaps are intended to increase rendering speed and reduce aliasing artefacts. A higher resolution mipmap would be used for high density samples, such as objects close to the viewpoint (camera), with lower resolution mipmaps being used for objects that are further away.

When using mipmaps, typically a desired level of detail (LOD) at which to sample the texture will be defined (e.g. based on the distance of the surface to which the texture is to be applied from the viewpoint (camera)), and the texture sampling operation will then either sample the closest mipmap to that level of detail, or sample the two mipmap levels that fall either side of the desired level of detail and then combine the samples from the two mipmap levels appropriately (e.g. based on their relative "distance" from the actual level of detail that is required). The latter may be done using a trilinear sampling process, in which bilinear filtering is used to take a sample from each mipmap level, and then those two samples, one from each mipmap level, are appropriately combined (e.g. using a weighted average based on the difference between the level of detail of the mipmap and the actual level of detail to be sampled), to provide the output sampled texture value.

For example, when using a texture for an image having a resolution of 40×40 sampling positions, with mipmaps of, say, 128×128, 64×64 and 32×32 texels, an interpolation of the 64×64 and the 32×32 mipmaps (with trilinear interpolation) may be used.

An issue that arises with texture mapping in graphics processing is where the surface to which the texture that is being sampled is to be applied is at an oblique viewing angle with respect to the viewpoint (camera), as in that case, the "projection" of the sampling position as seen from the viewpoint onto the surface (and thus the texture being sampled) (making the assumption that the sampling point being projected is circular) will not be in the form of a circle (as it would if the surface were perpendicular to the view direction), but will rather be in the form of an ellipse (with the ellipse's dimensions being determined by the angle that the surface has relative to the view direction).

FIG. 1 illustrates this and shows an exemplary render output 1 corresponding to the plane of the screen on which the image being rendered is to be displayed, and comprising a plurality of sampling positions (pixels) 2 (which are assumed to be circular) and for which, e.g., respective texture samples will need to be taken in order to render the pixels appropriately. (FIG. 1 simply shows a small section of the pixels 2 of the render output 1. It will be appreciated that the entire area of render output 1 will comprise an appropriate array of pixels.)

FIG. 1 also shows a "camera" 3, corresponding to the viewpoint with respect to which the render output is being rendered.

As shown in FIG. 1, for an exemplary pixel 4 which will sample a 3D surface 5 that lies at an oblique angle to the view direction from the camera 3, the effective projection of the view "cone" 6 projected from the camera position 3 through the (circular) pixel 4 in the render output (screen) 1 onto the 3D surface 5 that lies at an oblique angle to the view direction will be an ellipse 7.

In such situations, simply taking a "circular" bilinear sample from the texture that is to be applied to the surface will lead to errors, e.g. in terms of the reproduced texture on the surface potentially being blurred and/or there being aliasing.

To address this, a texture sampling technique known as "anisotropic filtering" is used, in which multiple, e.g. bilinear, samples are taken along a line in the texture (typically referred to as the anisotropy direction), which line (anisotropy direction) is intended to correspond to the major axis of the "ellipse" (the elliptical footprint) that corresponds to the projection of the sampling point onto the surface that the texture is to be applied to.

The plural, e.g. bilinear, samples taken along the anisotropy direction are then appropriately combined, e.g. based on their distance along the anisotropy direction from the centre of the projected "ellipse", to provide the overall output sampled texture value that is returned and used for texturing the sampling point in question.

Correspondingly, when using mipmaps, an appropriate number of plural trilinear samples will be taken along the anisotropy direction (and then appropriately combined to provide the output sampled texture value to be used). In this case therefore, a corresponding number of bilinear samples will be taken in each mipmap level along the anisotropy direction, and then the corresponding pairs of bilinear samples from each mipmap level combined to provide the appropriate trilinear sample value, with those trilinear sample values then being appropriately combined to provide the overall output sampled texture value.

FIG. 2 illustrates this and shows the taking of plural (in this case six) texture samples 20 along an anisotropy direction 21 corresponding to the major axis of an "ellipse" 22 corresponding to the projection of the sampling position onto the surface (as discussed above) in the appropriate pair of mipmap levels, comprising a more detailed mipmap level 23, and a less detailed mipmap level 24. The samples from each mipmap level are then appropriately combined in a pairwise fashion to provide, in effect, a set of plural trilinear samples along the anisotropy direction, which trilinear samples are then correspondingly appropriately combined to give the final output sampled texture value.

While anisotropic filtering provides an improvement over "basic" bilinear or trilinear filtering when sampling textures for surfaces that are at oblique viewing angles with respect to the view direction, the Applicants believe that there remains scope for improved techniques for anisotropic filtering when performing graphics texture mapping.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
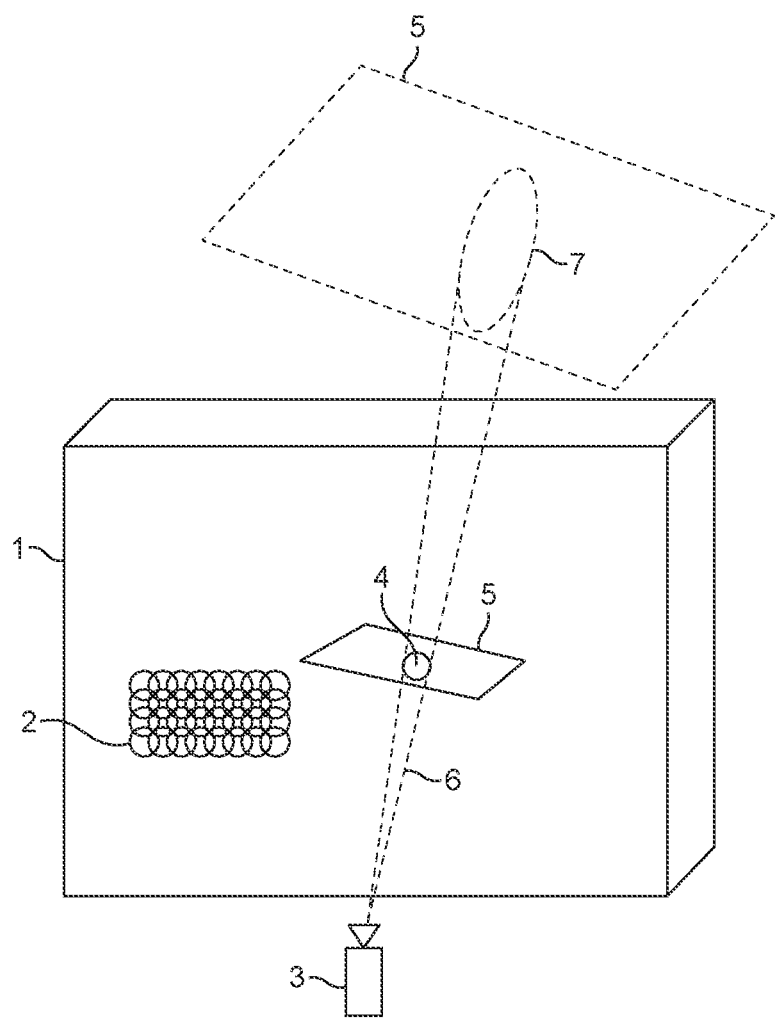
FIG. 1 shows the principles of anisotropic filtering when sampling a texture.

A first embodiment of the technology described herein comprises a method of performing anisotropic filtering when sampling a texture to provide an output sampled texture value for use when rendering an output in a graphics processing system, the method comprising:

when sampling a texture that is provided as two or more mipmaps using anisotropic filtering to provide an output sampled texture value:

determining a pair of mipmap levels, comprising a first, more detailed mipmap level, and a second, less detailed mipmap level, from which to take samples to provide the output sampled texture value;

determining an anisotropy direction along which to take one or more samples in the determined two mipmap levels;

taking samples for a first number of positions along the anisotropy direction in the more detailed mipmap level;

taking samples for a second, smaller number of one or more positions along the anisotropy direction in the less detailed mipmap level;

and combining the samples taken along the anisotropy direction in the more detailed mipmap level and the sample or samples taken along the anisotropy direction in the less detailed mipmap level to provide an output sampled texture value for use.

A second embodiment of the technology described herein comprises an apparatus for performing anisotropic filtering when sampling a texture to provide an output sampled texture value for use when rendering an output in a graphics processing system, the apparatus comprising:

a mipmap level selecting circuit configured to, when a texture that is provided as two or more mipmaps is to be sampled using anisotropic filtering to provide an output sampled texture value, determine a pair of mipmap levels, comprising a first, more detailed mipmap level, and a second, less detailed mipmap level, from which to take samples to provide the output sampled texture value;

an anisotropy direction determining circuit configured to determine an anisotropy direction along which to take one or more samples in the determined two mipmap levels;

a number of positions to sample determining circuit configured to determine a first number of positions for which to take samples along the anisotropy direction in the more detailed mipmap level, and a second, smaller number of one or more positions for which to take samples along the anisotropy direction in the less detailed mipmap level;

a texture sampling circuit configured to take samples for the determined first number of positions along the anisotropy direction in the more detailed mipmap level, and for the second, smaller number of one or more positions along the anisotropy direction in the less detailed mipmap level;

and a sample combining circuit configured to combine the samples taken along the anisotropy direction in the more detailed mipmap level and the sample or samples taken along the anisotropy direction in the less detailed mipmap level to provide an output sampled texture value for use.

The technology described herein relates to anisotropic filtering when sampling textures for use in graphics processing. In the technology described herein, when performing anisotropic filtering from a pair of mipmaps (comprising a more detailed and a less detailed mipmap level), samples are taken in each mipmap level for one or more positions along a defined anisotropy direction (which, as will be discussed further below, in an embodiment corresponds to the direction of the major axis of an ellipse that represents the projection of the sampling point that is being viewed on to the surface that the texture is to be applied to).

However, in the technology described herein, rather than taking samples for the same number of positions along the anisotropy direction in both the more detailed mipmap level and the less detailed mipmap level (as would be the case normally when performing anisotropic filtering of a texture), in the technology described herein samples are taken for fewer positions along the anisotropy direction in the less detailed mipmap level than along the anisotropy direction in the more detailed mipmap level.

As will be discussed in more detail below, the Applicants have found that taking relatively fewer samples in the less detailed mipmap level can avoid taking samples in that mipmap level that are, in effect, redundant, whilst still providing the necessary information from that mipmap level to provide acceptable visual quality. Correspondingly, taking more samples from the more detailed mipmap level can help to avoid undesirable visual artefacts, such as aliasing and bad image quality, that may arise due to an effective undersampling of the more detailed mipmap level. By varying the relative number of positions that are sampled taken in each mipmap level, these visual benefits can be achieved whilst, for example, reducing (or at least not increasing significantly) the total number of samples that are taken across the two mipmaps.

The technology described herein can thus provide a more efficient anisotropic filtering operation which can, in particular avoid oversampling and/or undersampling artefacts in any of the two mipmap levels from which the samples are taken (indeed the Applicants believe that the operation of the technology described herein, in its embodiments at least, may provide improved image quality due to reduced or no undersampling in the more detailed mipmap level), while not increasing significantly (or indeed at all) the processing requirements for obtaining the output sampled texture value for use.

The texture that is being sampled in the technology described herein can be any suitable and desired texture that can be used in and for graphics processing, and can represent and store any suitable and desired data that textures may be used to represent in graphics processing and graphics processing systems. Thus the texture may represent, for example, appropriate colour values (e.g. RGBα values) (and in one embodiment that is the case), such as an image, but could also represent other graphics processing parameters and data that may be represented using textures, such as luminance values, light/shadow values, depth values, etc. The technology described herein is applicable irrespective of the actual data that the texture being sampled represents.

Correspondingly the texture being sampled should, and in an embodiment does, comprise an appropriate (e.g. 2D) array of texture data elements (texels), each having an associated data (e.g. colour) value. The texture value that it is desired to sample will, correspondingly, in an embodiment be indicated by indicating an appropriate position or positions within the texture (texture coordinates) at which the texture is to be sampled to provide the output sampled texture value that is required for the graphics processing texturing operation in question.

The texture being sampled should be, and is in an embodiment, provided as a plurality of mipmaps (mipmap levels), with each mipmap level being progressively less detailed than the previous level. The set of mipmaps for the texture may comprise only two mipmap levels, but in an embodiment comprises more than two mipmap levels, for example extending from a most detailed mipmap level through progressively less detailed mipmap levels down to a least detailed mipmap level, for example comprising a single texel. In general, the mipmap levels for the texture can be arranged and configured as desired, e.g., and in an embodiment, in accordance with the way that textures are organised and configured as mipmap levels for the graphics processor and graphics processing system, and/or application that requires the graphics processing, in question.

The technology described herein relates to the situation where the texture is being anisotropically sampled. In this case, as discussed above, an appropriate anisotropy direction along which to take samples of the texture will be determined, with samples then being taken along the anisotropy direction, and combined appropriately to provide an output sampled texture value.

The anisotropy direction along which the samples are taken in the technology described herein (and any other parameters used for the anisotropic filtering) can be determined in any suitable and desired manner. However, in an embodiment this is done by assuming that the sampling point for which the texture value is to be used will project as an ellipse onto the surface to which the texture is being applied.

Thus the anisotropic filtering process that is performed in the technology described herein is in an embodiment configured to, and operates to, take samples based on an estimated elliptical coverage region within the texture, that is intended to correspond to the projection of the sampling point onto the surface to which the texture is being applied.

To facilitate this, the technology described herein in an embodiment further comprises (and the texture sampling apparatus further comprises a circuit or circuits configured to) determining one or more parameters for an ellipse that is estimated and intended to correspond to the projection of the sampling point for which the texture is being sampled onto the surface to which the texture is applied, and in particular, and in an embodiment, appropriate parameters for that ellipse that can then be used to control the anisotropic filtering process appropriately.

In an embodiment a length and a direction for the major axis, and a length for the minor axis, for an ellipse that corresponds to the projection of the sampling point onto the surface to which the texture is being applied are determined. (The use of these parameters will be discussed in more detail below.)

In an embodiment the size and shape, in an embodiment, as discussed above, in terms of a length and direction for the major axis, and a length for the minor axis, of the ellipse within the coordinate system of the texture that is being applied to the surface in question is determined, so as to, in effect, determine the elliptical footprint of the projected sampling point onto the surface in the texture that is being sampled.

These parameters for the "projected ellipse" (for the elliptical footpoint of the projected sampling point on the surface to which the texture is being applied) can be determined as desired and in any suitable and desired manner. For example, they may be determined using the derivatives of the texture coordinate(s) to be sampled (and in an embodiment, that is what is done).

The anisotropy direction along which to take the samples in the determined two mipmap levels is correspondingly in an embodiment selected and determined based on the so-determined elliptical footprint in the texture. Thus, in an embodiment, the anisotropy direction is based on, and in an embodiment corresponds to, the (direction of the) major axis of the assumed elliptical footprint of the sampling point to which the texture value is being applied as projected onto the surface to which the texture is being applied. Thus, in an embodiment, the anisotropy direction comprises a determined major axis direction for an ellipse that corresponds to the projection of the sampling point onto the surface to which the texture is being applied. Other arrangements would, of course, be possible.

In these embodiments of the technology described herein, when performing the anisotropic filtering, two texture mipmap levels are sampled. One mipmap level is more detailed (i.e. comprises a higher resolution (more detailed) version of the texture in question), and the other mipmap level of the two comprises a less detailed (a lower resolution) version of the texture that is being sampled. Any two mipmap levels from which to take samples can be selected.

In an embodiment, the two mipmap levels from which the texture samples are taken comprise (immediately) adjacent levels in the mipmap hierarchy.

The two mipmap levels to sample from can be selected and determined in accordance with any suitable and desired criteria and condition. In an embodiment, they are determined based on a level of detail (LOD) at which the texture is to be sampled.

The level of detail at which the texture is to be sampled can correspondingly be determined in any suitable and desired manner. In an embodiment, it is (at least) determined based on the projected ellipse for the sampling position on the surface that the texture is being applied to. In an embodiment, the level of detail is determined based, at least in part, on a determined length of the minor axis of the projected ellipse for the sampling point in question (as discussed above). Other arrangements would, of course, be possible.

In an embodiment the mipmap levels that fall either side of the determined level of detail are selected and sampled from. Thus, the more detailed mipmap level that is the closest mipmap level to the determined level of detail (but that is more detailed than the determined level of detail), and the less detailed mipmap level that is closest to the determined level of detail (but less detailed than the determined level of detail), are in an embodiment selected as the mipmap levels to sample.

The level of detail that the mipmaps levels to use are selected based on could simply be an initial, "raw" level of detail that is, e.g., determined based on the projection of the sampling point onto the surface to which the texture is to be applied (and e.g., and in an embodiment, the (estimated) length of the minor axis of the elliptical projection).

However, in an embodiment, the level of detail that is actually used to select the mipmap levels to use can also, and in an embodiment does also, take account of other "level of detail" parameters that can be set and used, e.g. by the application that is requiring the texture mapping operation.

For example, where it is possible to set a level of detail "bias" that will modify the initially determined level of detail, then in an embodiment that level of detail bias is taken into account when selecting mipmap levels, e.g., and in an embodiment, such that the level of detail as modified by the level of detail bias is used when selecting and to select the mipmap levels to sample from.

Correspondingly, where high and/or low level of detail "clamps" can be set (so as to cap the highest or lowest level of detail that can be sampled), then again in an embodiment any such level of detail clamping is taken into account when determining the level of detail to use for selecting the mipmap levels to sample from.

Thus, in an embodiment, where one or more of a level of detail bias, and level of detail high and low clamps, can be set if desired, the level of detail that is used to determine which mipmap levels to sample from is based (at least in part) on an initially determined raw level of detail and any level of detail bias and clamps that are set, and in an embodiment is determined (at least in part) from an initially determined raw level of detail and any level of detail bias and clamps that are set, as follows:

Raw_LOD=compute_anisotropic_LOD;

Biased_LOD=raw_LOD+LOD_bias;

Clamped_LOD=max(LOD_low_clamp,min(biased_LOD,LOD_high_clamp));

where:
compute_anisotropic_LOD is the "raw" level of detail determined for the anisotropic filtering, e.g., and in an embodiment, based on a determined length for the minor axis of the elliptical footprint that is estimated as the projection of the sampling point onto the surface to which the texture being sampled is to be applied;
LOD_bias is the value of the LOD bias (if any) that has been set;
LOD_low_clamp is the LOD low clamp, if any, that has been set; and
LOD_high_clamp is the LOD high clamp, if any, that has been set.

In this case, Clamped_LOD will then be the level of detail value to be used when determining the mipmap(s) from which to take the samples to determine the output sampled texture value to be used.

(In this operation, it is assumed that a smaller level of detail value implies a higher level of detail (thus level of detail "0" is the highest level of detail (the most detailed mipmap level)). Corresponding operations can be performed where a higher level of detail value indicates a higher level of detail.)

As well as taking account of any "level of detail" parameters, such as a level of detail bias and level of detail high and low clamps, as discussed above, the level of detail that is actually used to select the mipmap levels to use in an embodiment also takes account of, and is dependent upon, any (further) adjustments that may be made to the level of detail (e.g. to the Clamped_LOD) that is determined after applying any level of detail bias and level of detail high and low clamps.

For example, and in an embodiment, in the case where a further adjustment, such as a rounding, is applied to the level of detail determined after any level of detail bias, and level of detail high and low clamps, have been applied, then it is in an embodiment that "adjusted" (e.g. rounded) level of detail that is actually used to determine and select the mipmap level(s) to use.

Thus, in an embodiment, the "final" level of detail (Final_LOD) that is used to determine which mipmap levels to sample from is the level of detail after any adjustments, such as rounding, have been applied, and is in an embodiment determined from an initially determined level of raw level of detail, any level of detail bias and/or clamps that are set, and any adjustments, such as rounding, that is to be applied (to the level of detail that is determined from the raw level of detail and any level of detail bias and clamps that are set).

In an embodiment, the system supports a number of different modes of "mipmapping" operation ("mipmap" modes), which specify how the final level of detail (the Final_LOD) that determines the mipmap(s) to be sampled is to be determined (e.g., and in an embodiment, from an initially determined raw level of detail, and any level of detail bias and/or clamps that are set). In this case, the "mipmap" mode being used in an embodiment can be, and is in an embodiment, set by the application that requires the graphics processing, and/or by the, e.g., driver for the graphics processor (e.g. in addition to and/or irrespective of any application-specified mipmap mode setting).

In this case, there is in an embodiment one "mipmap" mode in which the level of detail that is used to determine the mipmap(s) to be sampled is permitted to have, and can have, a fractional value.

This mode in an embodiment uses the "Clamped_LOD" value determined as above, without applying any further adjustment (e.g. rounding) (and so will have a fractional value in the case where the "Clamped_LOD" is determined to be a fractional value). In this case therefore, the Final_LOD value that is used to determine the mipmap levels to be sampled will be the Clamped_LOD value determined as above.

There is in an embodiment then a second mode in which the level of detail, e.g. the "Clamped_LOD", is rounded to an integer value, and in an embodiment to the nearest integer value. In this case, the Final_LOD value that is used to determine the mipmap level to sample will accordingly, and in an embodiment, be determined by rounding the, e.g. Clamped_LOD value to the, e.g. nearest, integer LOD value.

Other LOD "rounding" modes may also or instead be used. For example, rounding could be performed in the event that the Clamped_LOD is within a particular, in an embodiment selected, in an embodiment predetermined, margin of the nearest integer LOD value (in which case the Clamped_LOD will be rounded to that integer value), but if the Clamped_LOD is not within the margin, then either the actual, fractional Clamped_LOD is used, or a modified (adjusted) value of the fractional part of the Clamped_LOD is used, for example by adjusting it to fall within the range 0-1 (instead of the existing fractional range in between the "rounding margins").

Other arrangements would, of course, be possible.

The mipmaps from which to take the samples to determine the output sampled texture value to be used may be determined from the Final_LOD (i.e. after adjustment (rounding), if any) in any suitable and desired manner.

For example in the case where the Final_LOD value is a fractional value (e.g. the Clamped_LOD value is used in its as determined form, without any further adjustment (e.g. rounding)), then in an embodiment that final LOD value is used to select two mipmap levels to sample from and "blend" together, e.g., and in an embodiment, using appropriate interpolation based on the fractional (part of the) level of detail. Thus in the case of a fractional Final_LOD value, then the Final_LOD value will be used to determine the two mipmap levels to be blended together, and, in an embodiment, how that blending is to be performed, such as, and in an embodiment, the weighting of the two mipmap levels in the blended result.

On the other hand, where the Final_LOD value (i.e. after adjustment (rounding)) is an integer value (which may, e.g., be the case where the mipmap mode specifies rounding the Clamped_LOD value to the, e.g. nearest, integer LOD value), then that (integer) Final_LOD value is in an embodiment used to determine a single mipmap level to sample from.

In the technology described herein, samples are taken for a first number of positions along the anisotropy direction in the more detailed mipmap level, and for a second, smaller number of one or more positions along the anisotropy direction in the less detailed mipmap level (the texture is sampled for (at) a first, higher (greater) number of positions along the anisotropy direction in the more detailed mipmap level, and for (at) a second, smaller number of sampling positions along the anisotropy direction in the less detailed mipmap level). In other words, a first, higher (greater) number of samples are taken along the anisotropy direction in the (selected) more detailed mipmap level, and a second, smaller number of samples are taken along the anisotropy direction in the (selected) less detailed mipmap level.

It should be noted here that, as will be discussed further below, it would be possible to take a single (e.g. bilinear) sample for each position along the anisotropy direction (and in one embodiment that is what is done), but it would also be possible to take plural (e.g. bilinear) samples for each position along the anisotropy direction. Thus, unless the context requires otherwise, references to taking samples and sampling for or at a position along the anisotropy direction include taking only a single sample for (at) the position in question and taking plural samples for (at) the position in question.

In general, samples will be taken for two or more positions along the anisotropy direction in the more detailed mipmap level, and for one or more positions (but fewer positions than are sampled along the anisotropy direction in the more detailed mipmap level) along the anisotropy direction in the less detailed mipmap level. There could, accordingly, be only a single position sampled along the anisotropy direction in the less detailed mipmap level (with plural positions being sampled along the anisotropy direction in the more detailed mipmap level), but in an embodiment, there are still plural positions sampled along the anisotropy level in the less detailed mipmap level, with a greater number of (plural) positions being sampled along the anisotropy direction in the more detailed mipmap level.

The relative numbers of positions that are sampled in each mipmap level can be selected as desired (so long as more positions are sampled in the more detailed mipmap level than in the less detailed mipmap level). In an embodiment, the ratio of the number of positions to sample in the more detailed mipmap level relative to the number of positions that are sampled in the less detailed mipmap level is based on, and in an embodiment (substantially) equal to, the ratio of the resolution of the more detailed mipmap level to the resolution of the less detailed mipmap level. Thus, in one embodiment, twice as many positions are sampled in the more detailed mipmap level than in the less detailed mipmap level. This may be particularly applicable where the two mipmap levels differ in their resolution by a factor of 2. Other arrangements would, of course, be possible.

The actual number of positions that are sampled in each level (as well as the relative numbers of positions) can also be selected as desired.

In an embodiment, the number of positions for which samples are taken in each mipmap level is based on the spacing of the texels (the texel-to-texel distance) in the mipmap level in question. In an embodiment the number of positions sampled is such that the spacing between the positions along the anisotropy direction will be (substantially) equal to the spacing between texels in the mipmap level in question (i.e. such that there is (approximately) a one texel spacing between each position). This will accordingly mean that the positions will be spaced further apart in the less detailed mipmap level (as the texels in that level will be spaced further apart), and so there will be fewer positions for which samples taken in the less detailed mipmap level for a given distance along the anisotropy direction.

In an embodiment, the number of positions to take samples for in each mipmap level is determined based on a determined initial, "base" "anisotropy degree" that represents a "base" number of positions to be sampled from the texture for the anisotropic filtering process, with the number of positions to sample from each of the mipmap level then, for example, being set based on determined initial, base anisotropy degree (number of positions), for example to be greater than and/or less than that number of positions, as appropriate, and in an appropriate manner.

In this case, the determined initial, base "anisotropy degree" (the initially determined "base" number of positions to be sampled from the texture for the anisotropic filtering process) can be determined and set as desired.

In an embodiment, it is based, at least in part, on the number of positions for which it would be desirable to take samples for the anisotropic filtering process if sampling at the level of detail indicated by the estimated elliptical footprint of the sampling point on the surface to which the texture is to be applied (i.e. if sampling the texture at the "raw" level of detail determined for the anisotropic filtering, e.g., and in an embodiment, based on a determined length for the minor axis of the estimated elliptical footprint of the projection of the sampling point onto the surface to which the texture being sampled is to be applied (as discussed above)).

Thus, in an embodiment, a "raw" "anisotropy degree", that corresponds to a number of positions that should be sampled at the "raw" level of detail at which it is desired to sample the texture is determined, and the number of positions sampled in the more and less detailed mipmap levels is determined based (at least in part) on that "raw" anisotropy degree.

The "raw" anisotropy degree, corresponding to the "raw" number of positions that it would be desirable to sample at the "raw" level of detail based on the projected ellipse, can be determined in any suitable and desired manner. In an embodiment, it is based on, and in an embodiment determined (in an embodiment only) as, the ratio of the length of the major axis of the estimated projected ellipse for the sampling point to the length of the minor axis of the projected ellipse for the sampling point.

Thus, in an embodiment, the number of positions to sample in the more and less detailed mipmap levels is determined based, at least in part, on the ratio of the determined length of the major axis of the projected ellipse for the sampling point in question in the render output to the length of the minor axis of the projected ellipse for the sampling point in question in the render output (as discussed above).

The "base" anisotropy degree (number of positions) that is then used to determine the number of positions to sample from each mipmap level in these arrangements could simply be the "raw" anisotropy degree determined as discussed above (and in one embodiment, that is the case).

However, in embodiments, the base anisotropy degree (number of positions to be sampled from the texture) from which the number of positions to sample from each mipmap level is determined, is not (necessarily) the "raw" anisotropy degree simply determined as discussed above (i.e. as the ratio of the length of the major axis of the estimated projected ellipse for the sampling point to the length of the minor axis of the projected ellipse for the sampling point), but can be an anisotropy degree (number of positions) that is different to that "raw" anisotropy degree (and, e.g., and in an embodiment, that is less than the "raw" anisotropy degree).

In an embodiment, the base anisotropy degree (number of positions to be sampled from the texture) from which the number of positions to sample from each mipmap level is determined, is derived from (based at least in part on) the "raw" anisotropy degree (that is in an embodiment determined as the ratio of the length of the major axis of the ellipse to the length of the minor axis of the ellipse for the sampling point), and may not be the same as (and in an embodiment differs from) the "raw" anisotropy degree.

Embodiments of this will be discussed in more detail below, but as will be discussed, in an embodiment the base anisotropy degree (number of positions) from which the number of positions to sample in the more and less detailed mipmap levels is determined comprises either the "raw" anisotropy degree determined as discussed above, or an anisotropy degree (number of positions) that is fewer than the number of positions indicated by the "raw" anisotropy degree.

In these embodiments, the actual number of positions to sample in each mipmap level can be determined from the base anisotropy degree number of positions in any suitable and desired manner.

For example, the number of positions to sample in the less detailed mipmap level could simply be reduced from the so-determined base number of positions, with the number of positions sampled in the more detailed mipmap level simply being the determined base number of positions to sample (and in one embodiment that is the case). Conversely, in another embodiment, the determined base number of positions are sampled in the less detailed mipmap level, but more than the determined base number of positions are sampled in the more detailed mipmap level. In another embodiment, more than the base number of positions are sampled in the more detailed mipmap level, and fewer than the base number of positions are sampled in the less detailed mipmap level.

In general, it would be possible to increase or decrease the number of positions sampled relative to the base number of positions, as appropriate, in one or both of the more and less detailed mipmap levels (as appropriate), in any suitable and desired way, so long as there are more positions sampled in the more detailed mipmap level than in the less detailed mipmap level.

In an embodiment, the increase or decrease in the number of positions that are sampled in a mipmap level relative to the base number of positions is based, at least in part, on a level of detail at which the texture is to be sampled, and in an embodiment is based, at least in part, on, and is in accordance with, the distance (in terms of its level of detail) of the mipmap level in question from a level of detail at which the texture is intended to be sampled.

In an embodiment, the further the level of detail at which the texture is to be sampled is from the level of detail of the more detailed mipmap level, then the greater the increase in the number of positions that are sampled in the more detailed mipmap level compared to the base number of positions (and vice-versa). (Thus, if the level of detail at which the texture to be sampled is close to the level of detail of the more detailed mipmap level, the number of positions sampled in the more detailed mipmap level is in an embodiment close to the base number of positions.)

Correspondingly, in an embodiment, the further the level of detail at which the texture is to be sampled is from the level of detail of the less detailed mipmap level, then the greater the decrease in the number of positions that are sampled in the less detailed mipmap level from the base number of positions (and vice-versa). (Thus, if the level of detail at which the texture to be sampled is close to the level of detail of the less detailed mipmap level, the number of positions that are sampled in the less detailed mipmap level is in an embodiment close to the base number of positions.)

Thus, while in embodiments, the number of positions that are sampled in each mipmap level could be determined based simply on the "base" anisotropy degree that is, e.g., determined based on the projection of the sampling point in the render output onto the surface to which the texture is to be applied (and, e.g., in an embodiment, wholly or in part on the (estimated) ratio of the length of the major axis to the minor axis of the elliptical projection) (and in one embodiment, that is what is done), in an embodiment, a level of detail for the texture sampling operation can also be, and in an embodiment is also, taken into account and used when selecting the number of positions to sample in each mipmap level.

The level of detail that is used when determining the number of positions to sample in each mipmap level could simply be an initial, "raw" level of detail that is, e.g., determined based on the projection of the sampling point onto the surface to which the texture is to be applied (as discussed above). However, in an embodiment, the level of detail that is used for this purpose also takes account of other "level of detail" parameters (as discussed above), and in an embodiment comprises the actual level of detail that is used to select the mipmap levels to use, taking account of any additional "level of detail" parameters that may have been set, and/or any adjusting (rounding) of the level of detail, e.g. based on the selected mipmap mode (as discussed above), and in an embodiment corresponds to the "final" level of detail from which the mipmap level(s) to sample from are determined (so after any mipmap mode adjustments) in the manner set out above.

Thus, in an embodiment, the number of positions along the anisotropy direction for which to take samples in the more and less detailed mipmap levels is determined based, at least in part, on the level of detail that is used to select the mipmap levels to use. Correspondingly, in an embodiment, the number of positions along the anisotropy direction for which to take samples in each mipmap level is determined based both on the level of detail that is used to select the mipmap levels to use, and a base anisotropy degree (number of positions) that is based, at least in part, on the number of positions that it would be desirable to take samples for for the anisotropic filtering process based on the estimated projected elliptical footprint of the sampling point onto the surface to which the texture is being applied.

Thus, in an embodiment, the number of positions to sample in each mipmap level is determined based on both a determined "base" number of positions to sample (i.e. a "base" anisotropy degree), and a level of detail at which the texture is being sampled (and in an embodiment the "final" level of detail that is used to determine which mipmap levels to sample from).

In an embodiment, the number of positions to sample in each mipmap level is determined as follows:

//increased sample (position) count in mip0 (the more detailed mipmap level)

$$\text{sample\_count\_mip0} = \text{base\_aniso\_degree} \times \text{pow}(2.0, \text{final\_LOD} - \text{floor}(\text{final\_LOD}));$$

//reduced sample (position) count in mip1 (half as many positions in mip1) (the less detailed mipmap level)

$$\text{sample\_count\_mip1} = \text{base\_aniso\_degree} \times \text{pow}(2.0, \text{final\_LOD} - \text{floor}(\text{final\_LOD}) - 1.0);$$

where:

mip0 is the more detailed mipmap level;

sample_count_mip0 is the number of positions to sample in the more detailed mipmap level;

mip1 is the less detailed mipmap level;

sample_count_mip1 is the number of positions to sample in the less detailed mipmap level;

base_aniso_degree is the base determined number of positions to be sampled (as discussed above), e.g., and in an embodiment, based wholly or in part on the ratio of the length of the major axis to the length of the minor axis of the estimated elliptical projection of the sampling point onto the surface to which the texture is being applied; and final_LOD is the "final" level of detail that is used to determine which mipmap levels to sample from (in an embodiment including (after) any adjustments (e.g. rounding) has been performed) (and is in an embodiment determined as discussed above).

(Again, it is assumed here that a smaller level of detail value implies a higher level of detail. Corresponding operations again can be performed where a higher level of detail value indicates a higher level of detail.)

This will then have the effect of setting a higher number of positions to sample in the more detailed mipmap level than in the less detailed mipmap level, and such that the positions in each mipmap level will be spaced one texel apart (at least in the case where the mipmap levels vary in their resolution by a power of 2), as there will be half as many positions for which samples are taken in the less detailed mipmap level than in the more detailed mipmap level.

Thus, in embodiments, the number of positions determining circuit is configured to determine the number of positions to sample in each mipmap level in one or more of the manners discussed above. Correspondingly, the method of the technology described herein in an embodiment comprises determining a number of positions to sample in each mipmap level, in an embodiment in one or more of the manners discussed above.

Once the number of positions along the anisotropy direction for which samples should be taken has been determined for each mipmap level, then samples for that number of positions should be, and are in an embodiment, taken in the mipmap level in question.

The desired number of positions for which samples are taken can be arranged along the anisotropy direction in the mipmap level in any suitable and desired manner. In an embodiment, they are equally spaced along the anisotropy direction, and in an embodiment lie on the determined anisotropy direction (i.e. on the determined major axis of the elliptical footprint in the texture corresponding to the projection of the sampling point onto the surface to which the texture is to be applied). In an embodiment the determined number of positions for which samples are taken are positioned on the determined major axis in the texture of the elliptical projection of the sampling point onto the surface to which the texture is to be applied, and are equally spaced along the determined length of that major axis. The samples are in an embodiment centred on the ellipse centre (thus, if two samples are taken, then they are in an embodiment placed on the major axis equally far on either side of the centre of the ellipse).

The mipmap levels should be sampled at each position that samples are to be taken for. In one embodiment a single sample is taken for each position along the anisotropy direction that is to be sampled. In that case, that single sample is in an embodiment taken at the position in question. In another embodiment, plural samples are taken for each position along the anisotropy direction that is to be sampled (and in an embodiment the same number of plural samples is taken at each position). In this case those plural samples are in an embodiment combined appropriately to provide a result sampled value for the position in question. The plural samples are in an embodiment arranged appropriately around the position for which the samples are being taken, such as, and in an embodiment in an appropriate "super-sampling" pattern around the position.

Each sample that is taken for a position along the anisotropy direction could be a single, point sample from the texture (e.g. corresponding to the value of the nearest texel).

However, in an embodiment, each sample that is taken for a position in a mipmap level comprises a bilinearly filtered sample (e.g., and in an embodiment, in accordance with the bilinear filtering process for the graphics processing system in question). In this case, one (or more) bilinearly filtered samples will be taken for each position along the anisotropy direction in each mipmap level.

Thus in an embodiment, a first number of bilinear samples will be taken along the anisotropy direction in the more detailed mipmap level, and a second, smaller number of bilinear samples will be taken along the anisotropy direction in the less detailed mipmap level.

The samples themselves can be taken from the texture (and the sampled values determined) in any suitable and desired manner. This is in an embodiment done in accordance with the way that textures are otherwise sampled in the graphics processor and graphics processing system in question (e.g. when performing anisotropic filtering or otherwise).

(The technology described herein relates primarily to selecting the number of positions that are sampled in each mipmap level. There is accordingly no restriction on how the actual samples at that number of positions are taken, or the process that is used for that, and so the existing process or processes for sampling textures in the graphics processor and graphics processing system can be, and are in an embodiment, used to take samples at the desired number of positions in each mipmap level.)

It will be appreciated from the above that, in embodiments of the technology described herein at least, the operation in the manner of the technology described herein may determine that samples should be taken for a non-integer number of positions in one or both of the two mipmap levels. In such a case, the number of positions to sample could simply be rounded to the nearest integer (or the nearest highest integer, or the nearest lowest integer), as desired. Alternatively, in the case where the graphics processor and graphics processing system supports taking fractional samples from a texture, then that operation could be used to take samples for the desired non-integer number of positions in the mipmap level or levels in question.

Once the samples in the more and less detailed mipmap levels have been taken, then those samples are used to provide an output sampled texture value for use by the graphics processor (e.g. when generating the render output in question).

The samples in the more or less detailed mipmap levels, once taken, can be used (combined) to provide an output sampled texture value for use by the graphics processor (e.g. when generating the render output in question) in any suitable and desired manner. In an embodiment, the samples taken along the anisotropy direction in each of the mipmap values are in an embodiment (appropriately) combined within and for the mipmap level in question, so as to give a combined sampled value for the mipmap level in question. Thus, the samples for the more detailed mipmap level will be combined appropriately to provide a combined sampled value for that more detailed mipmap level, and, correspondingly, the samples for the less detailed mipmap level will be combined appropriately to give a (separate) combined sampled value for the less detailed mipmap level.

The (separate) combined sampled values determined for each of the two mipmap levels are in an embodiment then combined appropriately, e.g., and in an embodiment, according to the (fractional) level of detail value and its distance from the mipmap levels in question, e.g. and in an embodiment using linear interpolation according to any (the) fractional part of the LOD value, to provide the final, output sampled texture value.

The samples taken along the anisotropy direction in a mipmap level can be combined to provide a combined sampled value for the mipmap level in any suitable and desired manner. They are in an embodiment combined based on the distance of the sample (position) along the anisotropy direction from the centre of the major axis of the projected ellipse. In an embodiment the samples are combined in an appropriately weighted manner based on these factors, and in an embodiment an appropriately weighted average of the samples is determined.

In the case where an integer number of positions are to be sampled in a mipmap level, then, as discussed above, those samples are in an embodiment equally spaced along the anisotropy direction centred on the centre of the ellipse, and are in an embodiment combined based on the distance of the sample (position) along the anisotropy direction from the centre of the major axis of the projected ellipse (e.g., and in an embodiment, by weighting the contribution of the sample (position) to the combined result based on the distance of the sample (position) from the centre of the ellipse).

In the case of a fractional number of samples, then in the case where the number of samples is between 1 and 2, two samples are in an embodiment taken at progressively increasing spacings from each other as the number of samples increases from 1 to 2 (until they are exactly one texel apart when exactly two samples are to be taken). For a fractional number of samples above 2, then in an embodiment additional (e.g. two) new samples are added on either side of (and outside of) the existing two samples as the number of samples exceeds two (and, in an embodiment, spaced one texel apart), but with an interpolation weight based on how much above two the actual number of samples to be taken is (e.g., and in an embodiment such that the interpolation weight for the additional samples over 2 will, in effect, start at 0 for a sample count of two, and progressively increase as the number of samples to be taken increases (e.g. to 0.25 for a sample count of 4). (Correspondingly, in an embodiment, the interpolation weight of the initial (inner) two samples may be progressively decreased as the sample count increases above 2, so as to allow for the increased contributions (weightings) of the additional samples over 2 as the number of samples to be taken increases (this will then help to provide a smoother transition as the sample count increases above 2).)

The (separate) combined sampled values determined for each of the two mipmap levels are in an embodiment then combined appropriately, e.g., and in an embodiment, according to the (fractional) level of detail value and its distance from the mipmap levels in question (the distance of the mipmap level in question from the actual level of detail that it was desired to sample the texture at), e.g. and in an embodiment using linear interpolation according to any (the) fractional (part of the) LOD value, to provide the final, output sampled texture value.

Once the output sampled texture value has been determined, then that can be, and is in an embodiment, provided for use to the appropriate element of the graphics processor and graphics processing pipeline (e.g. to the fragment shader) for use.

The output sampled texture value can be used in any suitable and desired manner, and should be, and is in an embodiment, used in accordance with the normal texture mapping operation and use of textures in the graphics processor and graphics processing system in question. (As discussed above, the technology described herein essentially relates to how the output sampled texture value is determined. That output value can then be used as desired, and in the normal manner for such texture values.)

The output sampled texture value should correspondingly be used in accordance with and based on the data that the texture represents. Thus where the texture represents colour values (e.g. an image), the output sampled texture value may be used appropriately when rendering a sampling point in a render output (e.g. image, e.g. frame for display) that the graphics processor is rendering. Equally, where the texture represents other data values, such as light or shadow values, depth values, etc., then the output sampled texture value will be used appropriately, e.g. to determine and/or set lighting or shadow effects for the sampling position in question. Other arrangements would, of course, be possible.

As discussed above, the level of detail (the final level of detail) at which the texture is sampled may not correspond to the initial "raw" level of detail that is, e.g. determined based (solely) on the projection of the sampling point onto the surface to which the texture is to be applied, but may also be subject to and depend on other parameters, such as a level of detail bias, and/or high and/or low level of detail "clamps", and/or any applied adjustments (e.g. rounding) based on a "mipmap" mode.

The Applicants have recognised that where the "final" level of detail that is used to select the mipmaps and at which the texture is sampled, samples a less detailed version of the texture than the initial, "raw" level of detail that is determined based on the elliptical projection of the sampling point onto the surface to which the texture is to be applied, i.e. where the "effective level of detail bias", defined as:

effective_LOD_bias=final_LOD−raw_LOD;

where final_LOD and raw_LOD are defined as above, is positive (greater than 0) (with the assumption that a smaller level of detail value indicates a more detailed mipmap level), then the texture will, in effect, be being sampled at a more blurred mipmap level than the level indicated by the "raw" level of detail. (This is correct, because that is what the level of detail bias, etc., has caused to happen.)

However, the Applicants have recognised that in this case where the "effective level of detail bias" (as specified above) is positive, such that the final level of detail that is being sampled from essentially results in sampling from a more blurred (less detailed) mipmap level than the "raw" level of detail that is determined based on the projection of the sampling point onto the surface to which the texture is to be applied indicates, then the number of positions for which samples need to be taken from the less detailed mipmap levels that are actually being sampled can be reduced (relative to the number of positions that might normally be sampled), and spaced further apart, whilst still achieving an acceptable, and substantially the same, (visual) output when sampling the texture.

This can then facilitate a reduced amount of processing for the texture sampling (as the number of positions being sampled can be reduced), whilst still achieving the same (visual) output when sampling the texture.

Thus, in an embodiment, where it is determined that there is a positive "effective level of detail bias" (the effective level of detail bias (defined as discussed above) is greater than 0), i.e. where the actual, final level of detail, at which the texture is being sampled (in an embodiment after applying any adjustment (rounding) for a set "mipmap" mode), corresponds to a less detailed version of the texture than an initial "raw" level of detail that is solely determined based on the projection of the sampling point onto the surface to which the texture is to be applied (and which is in an embodiment determined from (and only from) the estimated length of the minor axis for an estimated elliptical projection of the sampling point onto the surface to which the texture is to be applied (as discussed above)), then the number of positions that are sampled along the anisotropy direction in the mipmap levels being sampled (the number of positions along the anisotropy direction for which the texture is sampled) is reduced. In an embodiment, a "base" anisotropy degree (number of positions to sample along the anisotropy direction) is set to a fewer number of positions than would be indicated by a "raw" anisotropy degree (number of positions) that is determined as the ratio of the length of the major axis to the length of the minor axis of the projected elliptical footprint of the render output sampling point onto the surface to which the texture is to be applied.

Thus, in an embodiment, it is determined whether there is a positive effective level of detail bias (as discussed above), and when the effective level of detail bias is positive, then the number of positions to sample along the anisotropy direction (in the mipmaps) is reduced. In an embodiment, in the case of a positive effective level of detail bias, a reduced number of positions for which to sample the texture is then used as the "base" number of positions (the base_aniso_degree) which is then varied in order to select the number of positions that are sampled along the anisotropy direction in the more and less detailed mipmap levels (as discussed above).

The reduced number of positions that is determined where there is a positive effective level of detail bias can be selected as desired, and based on any suitable and desired parameters. In an embodiment, it is based on the effective level of detail bias (i.e. the difference between the level of detail that the texture is being sampled at, and the "raw" level of detail that is determined based on the estimated elliptical footprint that is the projection of the sampling point onto the surface to which the texture being sampled is to be applied (e.g., and in an embodiment, based (solely) on the length of the minor axis for that elliptical footprint)).

In an embodiment, the determined effective level of detail bias is used to modify a "raw" number of positions that has been determined based on (and in an embodiment only on) an estimate of the projected elliptical footprint of the render output sampling point onto the surface to which the texture is to be applied.

Thus, in an embodiment, where it is determined that the effective level of detail bias (as discussed above) is positive, then a "base" number of positions to sample in the mipmap levels is determined based, at least in part, on the determined effective level of detail bias. In an embodiment, the determined effective level of detail bias is used to modify a "raw" number of positions determined based on the estimated elliptical footprint of the projection of the sampling point onto the surface to which the texture is applied (and that is in an embodiment based (solely) on the ratio of the length of the major axis of the ellipse to the length of the minor axis of the ellipse), to thereby provide a modified number of positions to be sampled (and from which, for example, the actual number of positions to sample in each of the two mipmap levels can then be determined, e.g., and in an embodiment, in one or more of the manners discussed above).

In this operation, if the effective level of detail bias is not positive (is not greater than 0), then in an embodiment the "raw" number of positions determined based on the estimated elliptical footprint of the projection of the sampling point onto the surface to which the texture is to be applied is used as the "base" number of positions to sample (along the anisotropy direction) when sampling the texture.

In an embodiment, the effective level of detail bias is used to select and set the "base" number of positions to be sampled as follows:

If (effective_LOD_bias is >0.0)
{ base_aniso_degree=raw_aniso_degree×pow(2.0,−effective_LOD_bias);

}
else
{
base_aniso_degree=raw_aniso_degree;
}
where effective_LOD_bias=final_LOD−raw_LOD (as discussed above);

raw_aniso_degree is the anisotropy degree (number of positions to sample) along the anisotropy direction determined from the elliptical footprint that is the projection of the render output sampling position onto the surface to which the texture is being applied (and is in an embodiment determined as the ratio of the length of the major axis to the length of the minor axis of that estimated ellipse); and base_aniso_degree is the "base" anisotropy degree (number of positions to sample) that will be used to determine the number of positions to sample along the anisotropy direction from the texture (e.g., and in an embodiment, in the more and less detailed mipmap levels in the manner discussed above).

(This again assumes that a lower level of detail value implies a more detailed mipmap level, and vice-versa. Corresponding arrangements can be used where a higher level of detail value indicates a more detailed mipmap level.)

It will be appreciated that this arrangement will reduce the number of positions to sample when there is a positive effective level of detail bias. For example, an effective level of detail bias of "+1" will halve the number of positions to be sampled (and thus halve the amount of work that needs to be done by the texture mapping process).

This will accordingly facilitate reducing (potentially significantly) the processing burden on the texture mapping process, in the event where a positive LOD_bias is specified by the application that requires the graphics processing, e.g. because a "blurred" visual effect is desired.

The Applicants have further recognised in this regard that this operation could correspondingly be used to reduce the rendering time for rendering frames (e.g. where a particular frame rate, such as a guaranteed minimum frame rate, is desired, such as may be the case in VR applications, for example), by deliberately specifying the level of detail bias to give a positive effective level of detail bias, so as to thereby then reduce the amount of texture sampling that will be done, and, accordingly, reduce the frame rendering time.

Thus, for example, it could be determined whether the frame rendering time is exceeding some threshold, and when it is determined that the frame rendering time is exceeding the threshold, the level of detail bias could be increased, so as to reduce the number of texture positions that are being sampled (albeit at some potential cost to the visual quality). This would then provide a relatively efficient method for performance scaling, for example in situations where rendering speed is important, such as for virtual reality applications, for example.

In this case, the application that requires the graphics processing, and/or the driver for the graphics processor, could monitor the frame rendering time/rate, and determine whether the relevant threshold has been exceeded or not, and when the threshold has been exceeded, then increase the level of detail bias accordingly.

The Applicants have further recognised that selecting and modifying the number of texture positions that are sampled based on the effective level of detail bias, and in particular reducing the number of positions that are sampled in the event of a positive effective level of detail bias, may be new and advantageous in its own right, and not just in the context of the earlier embodiments of the technology described herein relating to taking a greater number of samples in the more detailed mipmap level and a fewer number of samples in the less detailed mipmap level when sampling a texture using anisotropic filtering. For example, and as discussed above, reducing the number of samples that will be taken in this manner facilitates varying (and in particular reducing) the frame rendering time in use, irrespective of whether the same or different numbers of samples are being taken in each mipmap level (or, indeed, whether more than one mipmap level is being sampled at all).

Thus, a third embodiment of the technology described herein comprises a method of performing anisotropic filtering when sampling a texture to provide an output sampled texture value for use when rendering an output in a graphics processing system, in which a level of detail at which to sample the texture is determined from a determined raw level of detail and one or more other parameters, and in which the anisotropic filtering process includes determining a number of positions along an anisotropy direction in the texture for which to take samples when performing the anisotropic filtering to sample the texture;

the method comprising:

when the level of detail at which the texture to be sampled indicates sampling the texture at the same or a more detailed level of detail than the raw level of detail indicates, determining a first number of positions along the anisotropy direction in the texture for which to take samples when performing the anisotropic filtering to sample the texture; and when the level of detail at which the texture is to be sampled indicates sampling a less detailed version of the texture than the raw level of detail indicates, determining a second, smaller number of one or more positions than the first number of positions along the anisotropy direction in the texture for which to take samples when performing the anisotropic filtering to sample the texture.

A fourth embodiment of the technology described herein comprises an apparatus for performing anisotropic filtering to sample a texture to provide an output sampled texture value for use when rendering an output in a graphics processing system, the apparatus comprising:

a level of detail determining circuit configured to determine a level of detail at which to sample a texture from a determined raw level of detail and one or more other parameters;

a number of positions to sample determining circuit configured to determine a number of positions along an anisotropy direction in a texture for which to take samples when performing anisotropic filtering to sample the texture;

wherein the number of positions to sample determining circuit is configured to:

when the level of detail at which the texture to be sampled indicates sampling the texture at the same or a more detailed level of detail than the raw level of detail indicates, determine a first number of positions along an anisotropy direction in the texture for which to take samples when performing anisotropic filtering to sample the texture; and when the level of detail at which the texture is to be sampled indicates sampling a less detailed version of the texture than the raw level of detail indicates, determine a second, smaller number of one or more positions than the first number of positions along an anisotropy direction in the texture for which to take samples when performing anisotropic filtering to sample the texture.

As will be appreciated by those skilled in the art, these embodiments of the technology described herein can, and in an embodiment do, include any one or more or all of the features of the technology described herein discussed herein, as appropriate.

Thus, for example, the raw level of detail is in an embodiment determined based on an estimated elliptical projection of the sampling point to which the texture is to be applied onto the surface to which the texture is to be applied, and the one or more other parameters in an embodiment comprise at least a level of detail bias that can be set, and in an embodiment comprise a level of detail bias and one or more of, and in an embodiment both of, a level of detail high clamp and a level of detail low clamp. In an embodiment the level of detail at which to sample the texture is a "final" level of detail that is determined from the "raw" level of detail, and the other parameters, and, in an embodiment, after any adjustments (e.g. rounding), in the manner discussed above.

Correspondingly, the first number of positions that are determined to be sampled along the anisotropy direction where the level of detail at which the texture is to be sampled indicates sampling the texture at the same or a more detailed level of detail than the raw level of detail indicates, in an embodiment comprises a number of positions that is determined based on the estimated elliptical footprint that is the projection of the render output sampling position onto the surface to which the texture is being applied (and in an embodiment is the ratio of the length of the major axis to the length of the minor axis of that estimated ellipse).

Similarly, the determined smaller number of positions to sample along the anisotropy direction in the case where the level of detail at which the texture is to be sampled indicates sampling the texture at a less detailed level of detail than the raw level of detail indicates, is in an embodiment a reduced number of positions that is based on the first number of positions and the effective level of detail bias (i.e. the difference between the level of detail at which the texture is actually to be sampled and the raw level of detail). In an embodiment, it is the "base" number of positions (anisotropy degree) determined as discussed above.

Correspondingly, in an embodiment, the determined (base) number of positions is in an embodiment then used to determine the actual number of positions to sample in the texture (and, e.g., in one or more mipmap levels of the texture). The determined number of positions could simply be sampled in any and each mipmap level is being sampled. In an embodiment, that determined number of positions is used to derive two different numbers of positions to be sampled in two different mipmap levels, in the manner of the first and second embodiments of the technology described herein discussed above. In another embodiment, the determined number of positions (or a number of positions based on the determined number of positions) is sampled in a single version (e.g. mipmap level) of the texture only.

Once the number of positions to actually sample along the anisotropy direction in the one or plural mipmap levels has been determined, then those number or numbers of positions should be sampled (e.g. by taking a bilinear sample at each position, as discussed above), and combined appropriately to provide an output sampled texture value for use (as discussed above).

In an embodiment, and as discussed above, these embodiments of the technology described herein further comprise determining whether a frame rendering time is exceeding a threshold, and when it is determined that the frame rendering time is exceeding the threshold, setting an increased level of detail bias, thereby to reduce the determined number of positions to sample along the anisotropy direction in the texture.

Thus, in an embodiment of these embodiments of the technology described herein, a parameter that is used to modify the raw level of detail is a level of detail bias that can be set in use, and the method further comprises determining whether the render output generation time is exceeding a (in an embodiment selected, in an embodiment predetermined) threshold time, and, if so, increasing the level of detail bias (in a direction) so as to cause the texture to be sampled from a less detailed mipmap level or levels (than was previously being sampled).

Correspondingly, a fifth embodiment of the technology described herein comprises a graphics processing system, the graphics processing system comprising:

a graphics processor, the graphics processor comprising:
a texture mapping circuit configured to perform anisotropic filtering to sample a texture to provide an output sampled texture value for use when rendering an output in a graphics processing system, the texture mapping circuit comprising:
a level of detail determining circuit configured to determine a level of detail at which to sample a texture from a determined raw level of detail and one or more other parameters, including at least a level of detail bias;
a number of positions to sample determining circuit configured to determine a number of positions along an anisotropy direction in a texture for which to take samples when performing anisotropic filtering to sample the texture;
wherein the number of positions to sample determining circuit is configured to:
when the level of detail at which the texture to be sampled indicates sampling the texture at the same or a more detailed level of detail than the raw level of detail indicates, determine a first number of positions along an anisotropy direction in the texture for which to take samples when performing anisotropic filtering to sample the texture; and
when the level of detail at which the texture is to be sampled indicates sampling a less detailed version of the texture than the raw level of detail indicates, determine a second, smaller number of one or more positions than the first number of positions along an anisotropy direction in the texture for which to take samples when performing anisotropic filtering to sample the texture.

the graphics processing system further comprising:
a render output generating time monitoring circuit configured to:
determine whether the time to generate a render output exceeds a threshold time;
and
when it is determined that the generation time for a render output exceeds the threshold time, increase the level of detail bias being used by the level of detail determining circuit when determining the level of detail at which to sample a texture from a determined raw level of detail, in a direction so as to cause a less detailed version of the texture to be sampled.

Thus, in these cases, the level of detail bias will be changed (e.g. increased) from its previous value so as to cause the texture to be sampled from a less detailed mipmap level than was being sampled when generating the render output for which the render output generation time exceeded the threshold.

In these cases, the monitoring of the render output generating time and the setting of the level of detail bias accordingly is in an embodiment done by the application that is requiring the graphics processing, and/or by the driver for the graphics processor.

The above considers the situation where the level of detail (the final level of detail) at which the texture is sampled is less detailed than the initial, "raw" level of detail that is determined based on the elliptical projection of the render output sampling point onto the surface to which the texture is to be applied.

The Applicants have further recognised that the converse situation can arise, i.e. where the final level of detail at which the texture is sampled samples a more detailed version of the texture than the initial, "raw" level of detail that is determined based on the elliptical projection of the sampling point onto the surface to which the texture is to be applied, i.e. where the "effective level of detail bias" as defined above is negative (less than 0) (again with the assumption that a smaller level of detail value indicates a more detailed mipmap level).

In this case, the texture will, in effect, be being sampled at a mipmap level that is too detailed, which can cause aliasing and bad image quality. This may happen if a negative level of detail bias is specified by the application, or if the level of detail high clamp is set to a low value (which may be done, e.g., in the relatively common case where mipmaps are not present (so as to force the texture sampling to be done from the most detailed (and only) version of the texture)).

The Applicants have further recognised that in this case where the "effective level of detail bias" is negative, such that the final level of detail that it is being sampled from essentially results in sampling from a more detailed mipmap level than the "raw" level of detail that is determined based on the projection of the sampling point onto the surface to which the texture is to be sampled indicates, then it would be desirable to in fact take a greater number of samples (to take a greater number of samples for each position along the anisotropy direction that is to be sampled) from the more detailed mipmap level that is actually being sampled, so as to provide a better output quality from the texture sampling (and avoid or reduce aliasing, for example).

Thus, in an embodiment, where it is determined that there is a negative "effective level of detail bias" (i.e. the effective level of detail bias (defined as discussed above) is less than 0), i.e. where the actual, final level of detail, at which the texture is being sampled (in an embodiment after applying any adjustments (e.g. rounding)), corresponds to a more detailed version of the texture than an initial "raw" level of detail that is solely determined based on the projection of the render output sampling point onto the surface to which the texture is to be applied (and which is in an embodiment determined from (and only from) an estimated length of the minor axis for an estimated elliptical projection of the sampling point onto the surface to which the texture is to be applied (as discussed above)), then the number of samples that are taken in the mipmap level or in at least one of the mipmap levels being sampled is increased. In the case where two mipmap levels (i.e. a more and a less detailed mipmap level) are being sampled, then the number of samples that are taken is in an embodiment increased in both of the mipmap levels (relative to the initial number of samples that would be taken in the mipmap level in question)).

Thus, in an embodiment, it is determined whether there is a negative effective level of detail bias (as discussed above), and when the effective level of detail bias is negative, then the number of samples that are taken is increased.

An increase in the number of samples that are taken in the mipmap level or levels in these arrangements can be achieved in any suitable and desired manner. For example, it would be possible to increase the number of positions along the anisotropy direction for which the texture is sampled.

However, in an embodiment, the number of positions along the anisotropy direction for which the texture is sampled is not increased (thus the number of positions along the anisotropy direction for which the texture is sampled is in an embodiment still determined in accordance with any one or more of the manners discussed above), and the number of samples that are taken is instead increased by taking more samples for each position along the anisotropy direction for which samples are to be taken.

For example, and in an embodiment, rather than taking a single (e.g. bilinear) sample in the texture at each position along the anisotropy direction for which the texture is to be sampled, plural (e.g. bilinear) samples are taken in the texture at each position along the anisotropy direction for which the texture is to be sampled, with those plural samples then being combined to provide a result sample value for the position along the anisotropy direction in question (which result sample value for the position along the anisotropy direction can then be used with the result values for the other positions along the anisotropy direction that are being sampled to provide the overall output sampled texture value for use).

Thus, in an embodiment, where it is determined that there is a negative effective level of detail bias, each position along the anisotropy direction for which the texture is to be sampled is "supersampled" (i.e. a plurality of samples are taken for each position along the anisotropy direction for which the texture is to be sampled, with those plural samples then being appropriately combined to provide a result sample value for the position being sampled).

In this case where each position along the anisotropy direction to be sampled is being "supersampled", then the plurality of samples that are taken for a position along the anisotropy direction in an embodiment extend in two dimensions within the texture, i.e. the samples are not simply arranged along the anisotropy direction, or along one or other axis within the texture, but instead, in effect, and in an embodiment, cover a two-dimensional area in the texture (in the mipmap level being sampled) (for the position being sampled).

In an embodiment a "supersampling pattern" that extends in the x and y directions (in the axis directions) of the texture is used, so as to sample a two-dimensional area, at, and in an embodiment surrounding, the position along the anisotropy direction which is being sampled. For example, a 2×2 (or 3×3, etc.) pattern of samples at (and in an embodiment surrounding) the position along the anisotropy direction which is being sampled could be, and is in an embodiment, taken.

In this case, the supersampling pattern that is used can comprise any suitable and desired supersampling pattern, such as an ordered grid, a rotated grid, a circular pattern, a jittered pattern, etc. Correspondingly, the spacing between the individual samples making up the supersampling pattern can be configured as desired.

Thus, in an embodiment, rather than taking a single bilinear sample at each position along the anisotropy direction for which the texture is to be sampled, a plurality of bilinear samples, in an appropriate supersampling pattern, will be taken at each position along the anisotropy direction for which the texture is to be sampled.

Correspondingly, embodiments of the technology described herein comprise "supersampling" at a first number of positions along the anisotropy direction in the more detailed mipmap level, and "supersampling" at a second, smaller number of one or more positions along the anisotropy direction in the less detailed mipmap level.

The increased number of samples that is determined and taken where there is a negative effective level of detail bias can be selected as desired, and based on any suitable and desired parameters. In an embodiment, it is based on the effective level of detail bias (i.e. the difference between the level of detail that the texture is being sampled at, and the "raw" level of detail that is determined based on the estimated elliptical footprint that is the projection of the sampling point onto the surface to which the texture being sampled is to be applied (e.g., and in an embodiment, based (solely) on the length of the minor axis for that elliptical footprint)).

In an embodiment, the determined effective level of detail bias is used to select the number of samples to take for each position along the anisotropy direction that is to be sampled.

In an embodiment the determined effective level of detail bias is used to select one or more of, in an embodiment two of, and in an embodiment all of: the number of samples to take for each position along the anisotropy direction that is to be sampled; the spacing of those samples (e.g. around the position along the anisotropy direction); and the weighting of those samples (their relative contributions to the "supersampled" output value).

This can be achieved as desired. In an embodiment, the effective level of detail bias is used to determine a "supersampling degree", that represents, in effect, a number of (e.g. bilinear) samples that should be taken for each position along the anisotropy direction that is to be sampled.

The supersampling degree in an embodiment represents the number of samples to be taken, and is used to determine the number of samples that are taken, along each axis in the texture for the position (along the anisotropy direction) in question. Thus a supersampling degree of 1 in an embodiment indicates that a single sample will be taken, a supersampling degree of 2 in an embodiment indicates that a 2×2 sampling pattern will be taken, a supersampling degree of 4 in an embodiment indicates that a 4×4 pattern of samples is taken, and so on.

In an embodiment, fractional supersampling degrees can be determined. In this case, the supersampling degree determined from the effective level of detail bias could simply be rounded to the next highest (multiple of 2) integer value (and in one embodiment, that is done). Thus, in this case, where the determined supersampling degree is >1, but <2, the supersampling degree will be rounded to "2", i.e. such that two samples will be taken along each axis (a 2×2 supersampling pattern will be used).

However, in an embodiment, fractional supersampling degrees are used effectively to determine the spacing and/or the weighting of the samples that are being taken (in a supersampling pattern). In an embodiment, a (multiple of 2) integer supersampling degree indicates that that number of samples should be taken and spaced one texel apart from each other (in the relevant axis direction) (and be given equal weighting to each other in the "supersampled" output value), but a fractional supersampling degree value is in an embodiment handled as follows:

Firstly, in an embodiment, where the supersampling degree is between 1 and 2, the number of samples in the supersampling pattern do not change (and will correspond to a 2×2 supersampling pattern), but the samples in the pattern move progressively further apart as the supersampling degree increases from 1 to 2 (at which point the sampling positions in the supersampling pattern are in an embodiment spaced one texel apart).

Thus, for a fractional supersampling degree between 1 and 2, the next highest (multiple of 2) integer number of samples (i.e. 2×2 samples) is in an embodiment taken (and in an embodiment with equal weighting to each other), but with a spacing that is an appropriate fractional proportion of a single texel spacing. Thus, for example, for a supersampling degree of 1.5 in an embodiment a 2×2 sampling pattern is taken (being the next highest integer number of samples), but with those samples being spaced half a texel apart (rather than being spaced a whole texel apart).

In an embodiment, for a supersampling degree above 2, then in an embodiment additional samples are added (outside of) the existing 2×2 samples (that would correspond to a supersampling degree of 2), and in an embodiment spaced one texel apart, but with an interpolation weight based on how much above 2 the supersampling degree is. Thus for supersampling degrees greater than 2, in an embodiment extra samples will start to fade in around the border of the existing samples.

In an embodiment, for a supersampling degree above 2, the number of samples that is taken in an embodiment corresponds to the next higher (multiple of 2) integer number of samples (thus for supersampling degrees between 2 and 4, a 4×4 supersampling pattern will be used), but with the interpolation weights for the samples in the "increased" pattern being based on how much above 2 the supersampling degree is (e.g., and in an embodiment, such that the interpolation weight for the "additional", "outer" samples will, in effect, start at 0 for a supersampling degree of 2 and progressively increase as the supersampling degree increases). For example, for a supersampling degree of 2.1, 4×4 samples (spaced a texel apart from each other) will in an embodiment be taken, but with the outer "ring" of samples in an embodiment a very low interpolation weight, such as 0.1 percent or 1.1 percent.

Then, as the supersampling degree increases above 2, the samples will always be spaced one texel apart, but with the outer ring of samples having progressively higher interpolation weights. In this way, the "extra" samples will start to fade in around the border of the "inner" samples as the supersampling degree increases.

In these embodiments, the interpolation weights of the inner "core" of 2×2 samples are in an embodiment correspondingly reduced, e.g., based on the weights of the outer samples, to help provide a smoother transition.

Thus, for a fractional supersampling degree that is above 2, then in an embodiment the appropriate additional samples are taken surrounding the appropriate "core" 2×2 samples, with all the samples being spaced one texel apart, but the additional, outer samples are in an embodiment given lower interpolation weights as compared to the inner "core" samples, with the difference in interpolation weights as between the outer samples and the inner core of samples being progressively decreased as the supersampling degree increases above 2.

In an embodiment, the "supersampling degree" that is used to determine the number of samples, etc., (the "supersampling pattern") (in the x and y directions (along the x and y axes)) that is taken for each position along the anisotropy direction for which the texture is to be sampled, is determined as follows:

```
if (effective_LOD_bias<0)
{
    supersampling_degree=pow(2.0,-effective_LOD_
        bias);
}
else
{
supersampling_degree=1.0;  //this effectively disables supersampling
}
where
    effective_LOD_bias=final_LOD−raw_LOD (as dis-
        cussed above);
``` and supersampling_degree represents the number of samples to take along the x and y axes in the texture for each position along the anisotropy direction that is to be sampled (as discussed above).

(This again assumes that a lower level of detail value implies a more detailed mipmap level, and vice-versa.

Corresponding arrangements can be used where a high level of detail value indicates a more detailed mipmap level.)

It will be appreciated that this arrangement will take only a single sample where the effective level of detail is 0 or greater (since the supersampling degree is then set to 1), but will increase the number of samples that are taken when there is a negative effective level of detail bias.

For example, an effective level of detail bias of "−1" will cause 2×2 texture samples, spaced one texel apart (in the x and y directions) to be taken for each position along the anisotropy direction that is to be sampled.

As discussed above, in an embodiment, for a supersampling degree of 1, a single (e.g. bilinear) sample will be taken, then as the "supersampling degree" increases from 1 to 2, the single texture sample will split into 2×2 samples that gradually move apart, until at a supersampling degree of 2, 2×2 texture samples, spaced one texel apart (in the x and y directions) will be taken for each position along the anisotropy direction for which the texture is to be sampled. For supersampling degrees higher than 2, extra samples will fade in around the border of the existing samples.

This will accordingly facilitate avoiding aliasing, etc., in the case where a negative LOD bias or a low LOD high clamp is specified by the application that requires the graphics processing, e.g. because mipmaps are not present or are not available.

The Applicants have found that this arrangement can be used, for example, to provide sharper, higher-quality text-rendering. In particular, when conventional trilinear filtering is used for rendering text in such situations, the resulting image will be a mixture of samples from a too detailed mipmap level and a too blurred mipmap level, which can cause an inaccurate output, typically blurrier text. However, increasing the number of samples that are taken in the manner of these embodiments of the technology described herein, effectively provides "intermediate" mipmap levels, which thereby avoids the issue of sampling too detailed or too blurry mipmap levels and averaging the result.

The Applicants have further recognised that this arrangement may be particularly useful in the context of rendering applications where a texture being applied will be sampled for most of the render output (e.g. image) using the most detailed version of the texture, with only small amounts of the render output sampling a less detailed version or versions of the texture. This could arise, for example, in virtual reality (VR) applications, because the inverse distortion (barrel distortion) that is used in VR systems to compensate for the effects of the lenses in the VR headset causes most of the image to be rendered using a level of detail of 0, with only small amounts of the image being rendered with a level of detail >0 (i.e. using a less detailed version of the texture).

In this case, the operation of "supersampling" the more detailed version of the texture in the manner discussed above when there is a negative effective level of detail bias can be used to effectively produce the downscaled (less detailed) version of the texture that is needed for the particular portions of the image that need to be downscaled, and to provide acceptable visual output for those regions, without the need to generate the actual mipmaps corresponding to the less detailed versions of the texture that would be used for those regions in the image. This can then avoid the need to generate the mipmap chain for this process (which would normally be done in use before the sampling happens, by processing and downscaling the whole image to generate the mipmap chain (even though only small portions (perhaps only 5-10%) of the mipmap chain is actually subsequently read)).

These embodiments and arrangements of the technology described herein can accordingly potentially provide more efficient execution of an application in such circumstances (e.g. a VR application), notwithstanding that additional samples may need to be taken in the texture, by avoiding or reducing the need to generate the mipmap chain instead (whilst still providing acceptable visual quality).

The Applicants have further recognised that increasing the number of samples that are taken in the event of a negative effective level of detail bias may be new and advantageous in its own right, and not just in the context of the earlier embodiments of the technology described herein relating to sampling a greater number of positions in the more detailed mipmap level and a fewer number of positions in the less detailed mipmap level when sampling a texture using anisotropic filtering. For example, and as discussed above, increasing the number of samples that will be taken in this manner facilitates providing improved quality outputs, irrespective of whether the same or different numbers of positions are being sampled in each mipmap level (or, indeed, whether more than one mipmap level is being sampled at all (and, indeed, can remove the need to generate lower resolution mipmap levels in the first place)).

Thus, a sixth embodiment of the technology described herein comprises a method of performing anisotropic filtering when sampling a texture to provide an output sampled texture value for use when rendering output in a graphics processing system, in which a level of detail at which to sample the texture is determined from a raw level of detail and one or more other parameters, and in which the anisotropic filtering process includes determining a number of positions along an anisotropy direction in the texture for which to take samples when performing the anisotropic filtering to sample the texture;

the method comprising:

when the level of detail at which the texture to be sampled indicates sampling the texture at the same or a less detailed level of detail than the raw level of detail indicates, taking a first number of samples at each position along the anisotropy direction in the texture for which the texture is to be sampled when performing the anisotropic filtering to sample the texture; and when the level of detail at which the texture is to be sampled indicates sampling a more detailed version of the texture than the raw level of detail indicates, taking a second, larger number of samples than the first number of samples at each position along the anisotropy direction in the texture for which the texture is to be sampled when performing the anisotropic filtering to sample the texture.

A seventh embodiment of the technology described herein comprises an apparatus for performing anisotropic filtering to sample a texture to provide an output sampled texture value for use when rendering an output in a graphics processing system, the apparatus comprising:

a level of detail determining circuit configured to determine a level of detail at which to sample a texture from a determined raw level of detail and one or more other parameters;

a number of positions to sample determining circuit configured to determine a number of positions along an anisotropy direction in a texture for which to take samples when performing anisotropic filtering to sample the texture; and a number of samples to take determining circuit configured to determine a number of samples to take at each position along an anisotropy direction in a texture for which samples are to be taken when performing anisotropic filtering to sample the texture;

wherein the number of samples to take determining circuit is configured to:

when the level of detail at which the texture to be sampled indicates sampling the texture at the same or a less detailed level of detail than the raw level of detail indicates, determine a first number of samples to take at each position along an anisotropy direction in the texture for which the texture is to be sampled when performing anisotropic filtering to sample the texture; and when the level of detail at which the texture is to be sampled indicates sampling a more detailed version of the texture than the raw level of detail indicates, determine a second, larger number of samples than the first number of samples to take at each position along the anisotropy direction in the texture for which the texture is to be sampled when performing anisotropic filtering to sample the texture.

As will be appreciated by those skilled in the art, these embodiments of the technology described herein can, and in an embodiment do, include any one or more or all of the features of the technology described herein discussed herein, as appropriate.

Thus, for example, the raw level of detail is in an embodiment determined based on an estimated elliptical projection of the render output sampling point to which the texture is to be applied onto the surface to which the texture is to be applied, and the one or more other parameters in an embodiment comprise at least a level of detail bias that can be set, and in an embodiment comprise a level of detail bias and one or more of, and in an embodiment both of, a level of detail high clamp and a level of detail low clamp. In an embodiment the level of detail at which to sample the texture is a "final" level of detail that is determined from the "raw" level of detail, and the other parameters, and after any adjustments (e.g. rounding), in the manner discussed above.

Correspondingly, the first number of samples that are taken at each position along the anisotropy direction where the level of detail at which the texture to be sampled indicates sampling the texture at the same or a less detailed level of detail than the raw level of detail indicates, in an embodiment comprises taking a single, in an embodiment bilinear, sample at each position along the anisotropy direction.

Similarly, the determined larger number of samples to take at each position along the anisotropy direction in the case where the level of detail at which the texture to be sampled indicates sampling a more detailed version of the texture than the raw level of detail indicates, in an embodiment comprise taking a plurality of (in an embodiment bilinear) samples for each position, and in an embodiment comprises taking samples in a supersampling pattern, in an embodiment comprising at least 2×2 supersampling positions, at each position along the anisotropy direction for which the texture is to be sampled.

Correspondingly, in an embodiment, the second greater number of samples to take at each position along the anisotropy direction in the case where the level of detail at which the texture is to be sampled indicates sampling the texture at a more detailed level of detail than the raw level of detail, is in an embodiment based on the effective level of detail bias (i.e. the difference between the level of detail at which the texture is actually to be sampled and the raw level of detail).

Correspondingly, in an embodiment, the plurality of samples taken for a position along the anisotropy direction are in an embodiment then used (combined appropriately) to determine a texture sample result value for the position along the anisotropy direction, with those result samples for the positions along the anisotropy direction then being combined appropriately to provide an output sample texture value for use (as discussed above).

In an embodiment, the operation in this embodiment of the technology described herein is used when there is only a more detailed version of the texture that is available, to thereby, in effect, sample that more detailed version of the texture as a less detailed (lower resolution) mipmap level (level of detail).

The Applicants have recognised that increasing the number of samples in the manner of these embodiments of the technology described herein (i.e. performing supersampling) will increase the amount of sampling in the texture that is done, and so increase the processing burden on the graphics processor when generating the render output in question.

In an embodiment therefore, such "supersampling" operation can be selectively activated and deactivated (enabled and disabled). For example, an application that requires graphics processing could indicate whether such supersampling operation is permitted when performing graphics processing to generate render outputs for the application in question (e.g. either globally, or on a render output-by-render output basis), and/or the application could set a maximum level of supersampling (supersampling degree) that is permitted.

Additionally or alternatively, the driver for the graphics processor could monitor the operation of the graphics processor and, e.g., and in an embodiment, enable and disable, and/or constrain, the supersampling operation as appropriate.

In an embodiment, the operation in accordance with the other embodiments of the technology described herein (i.e. sampling different numbers of positions in different mipmap levels, and/or reducing the number of positions that are sampled in a mipmap level can also or instead be selectively enabled and disabled. Again, such control can in an embodiment be performed either by the application and/or by the driver.

Other arrangements would, of course, be possible.

In an embodiment, the technology described herein is implemented in the texture mapping stage (the texture mapper/the texture mapping circuit) of a graphics processor of the graphics processing system. Thus, in an embodiment, a graphics processor comprises a texture mapper (a texture mapping circuit), and the texture mapper of the graphics processor is operable to determine the various anisotropic filtering parameters discussed above, and to set and select the number of positions at which the texture should be sampled, whether supersampling should be performed, etc., discussed above.

Thus, the technology described herein extends to, and in an embodiment comprises, a texture mapping circuit for a graphics processor that includes the apparatus of any of the embodiments of the technology described herein.

As well as the particular circuits necessary to perform the operation in the manner of the technology described herein, the texture mapper (texture mapping circuit) can otherwise include any suitable and desired circuits, units and stages for performing texture mapping operations, and perform the required texture mapping operations in any suitable and desired manner.

Thus it may, for example, and in an embodiment does, comprise one or more or all of: a texture filtering circuit for performing a texture filtering operation (and which can at least perform anisotropic filtering in the manner of the technology described herein, but in an embodiment also supports other filtering operations such as bilinear and trilinear filtering); a texture data fetching circuit operable to fetch data values for texture data elements to be used in a texture filtering operation (e.g., and in an embodiment, via an appropriate texture cache); a coordinate calculation circuit (stage); a level of detail computation circuit (stage); a texel selection circuit (stage); and an output result providing circuit (stage).

The operation in the manner of the technology described herein can be triggered in any suitable and desired manner. In an embodiment, it is performed in response to appropriate texture mapping requests (for a texture to be anisotropically sampled), e.g., and in an embodiment, that are made to the texture mapping stage (texture mapping circuit). Such requests can be triggered as required, for example, and in an embodiment, by the renderer (e.g. fragment shader) of the graphics processor and graphics processing pipeline, for example, in response to, and when, rendering operations require a texture mapping operation to be performed.

The anisotropic filtering operation in the manner of the technology described herein could be triggered automatically, e.g. whenever an anisotropic filtering texture mapping operation is required. Additionally or alternatively, the operation in the manner of the technology described herein could be allowed to be controlled by the application that is requiring the graphics processing (e.g. by exposing it to the API), such that an application (the application programmer) can then specify when anisotropic filtering should be performed in the manner of the technology described herein.

Other arrangements would, of course, be possible.

Although the technology described herein has been described above primarily with reference to a single, individual texture mapping and texture filtering operation (e.g. for a given sampling position in a render output), in practice when generating a render output, texture mapping operations will be repeated for plural render output sampling positions, e.g. across the entire area of a primitive being rendered. Thus the technology described herein is in an embodiment performed in respect of plural texture mapping operations, such as, and in an embodiment, for each of plural sampling positions in a render output being generated.

The operation in the manner of the technology described herein can be used for any suitable and desired form of texturing operation and graphics (or other) processing operation that may be performed using textures, such as, and in an embodiment, when generating frames (images) for display, but also when generating other, e.g. non-graphics, outputs.

As well as the texture mapping apparatus of the technology described herein, the graphics processor may include any one or more or all of the processing stages, circuits and elements that a graphics processor (processing pipeline) can normally include. Thus, for example, the graphics processor may include a primitive setup circuit, a rasteriser and/or a renderer. Additionally or alternatively, the graphics processor may be able to perform ray-tracing and/or hybrid ray-tracing.

In an embodiment, the graphics processor includes a renderer operable to perform graphics rendering operations, and the texture mapper is operable to perform graphics texturing operations in response to requests for graphics texturing operations from the renderer. The renderer is in an embodiment in the form of or includes a programmable fragment shader (that processes graphics fragments by executing fragment shader programs using respective execution threads for sampling positions of a render output being generated by the graphics processor).

The graphics processor (processing pipeline) may also contain any other suitable and desired processing stages and circuits that a graphics processing pipeline may contain such as a depth (or depth and stencil) tester(s), a blender, a tile buffer or buffers, a write out unit, etc.

The texture mapper and texture mapping apparatus could also be a co-processor of a CPU, for example (i.e. coupled with a CPU that executes a rendering pipeline, for example), if desired.

The graphics processor and/or texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise a memory or memories (memory system) for storing the data etc., referred to herein, which may be external to the graphics processor and texture mapping apparatus. The memory or memories may be operable to store, and may store, set(s) of texture mipmaps to be used in the texturing operations.

Thus, as will be appreciated, embodiments of the technology described herein may be implemented in a data/graphics processing system comprising a memory and a graphics processing unit (GPU) (a graphics processor) comprising a texture mapping apparatus as described herein. In an embodiment, the data/graphics processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The data/graphics processing system and/or graphics processor and/or texture mapping apparatus may also comprise, and/or be in communication with, one or more memories and/or memory devices that store the data described herein, and/or that store software for performing the processes described herein. The data/graphics processing system and/or graphics processor and/or texture mapping apparatus may also be in communication with a host microprocessor, and/or with a display for displaying images based on the data generated.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of texture mapping in a graphics processor in a data processing system.

Figure 3:
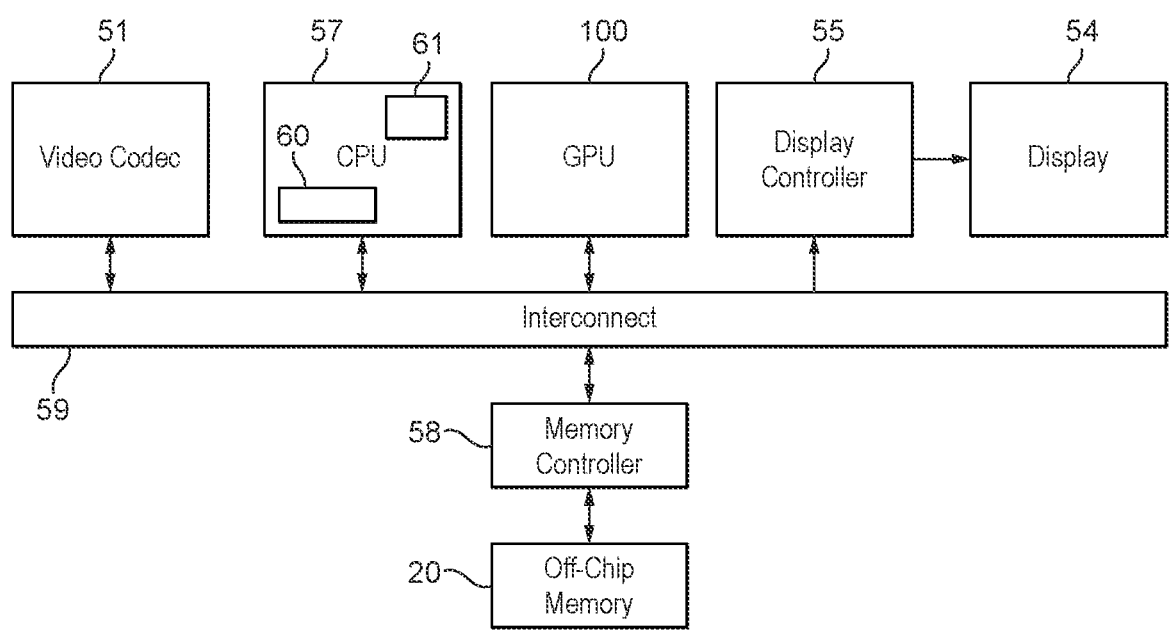
FIG. 3 shows an exemplary data processing system in which the technology described herein may be implemented.

FIG. 3 shows an exemplary data processing system in which the technology described herein and the present embodiments may be implemented.

The exemplary data processing system shown in FIG. 3 comprises a host processor comprising a central processing unit (CPU) 57, a graphics processor (GPU) 100, a video codec 51, a display controller 55, and a memory controller 58. As shown in FIG. 3, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 4:
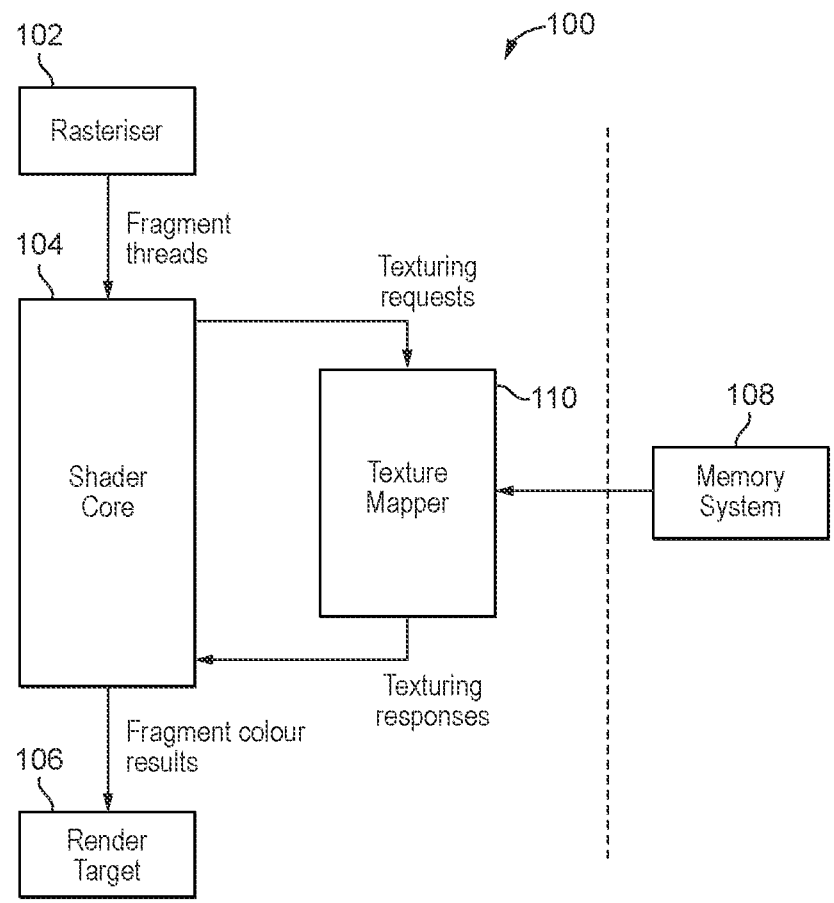
FIG. 4 shows schematically a graphics processor that includes a texture mapper.

FIG. 4 shows an exemplary graphics processor (graphics processing unit (GPU)) 100 that can perform texture mapping, that can be used in the data processing system of FIG. 3.

As shown in FIG. 4, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

Figure 5:
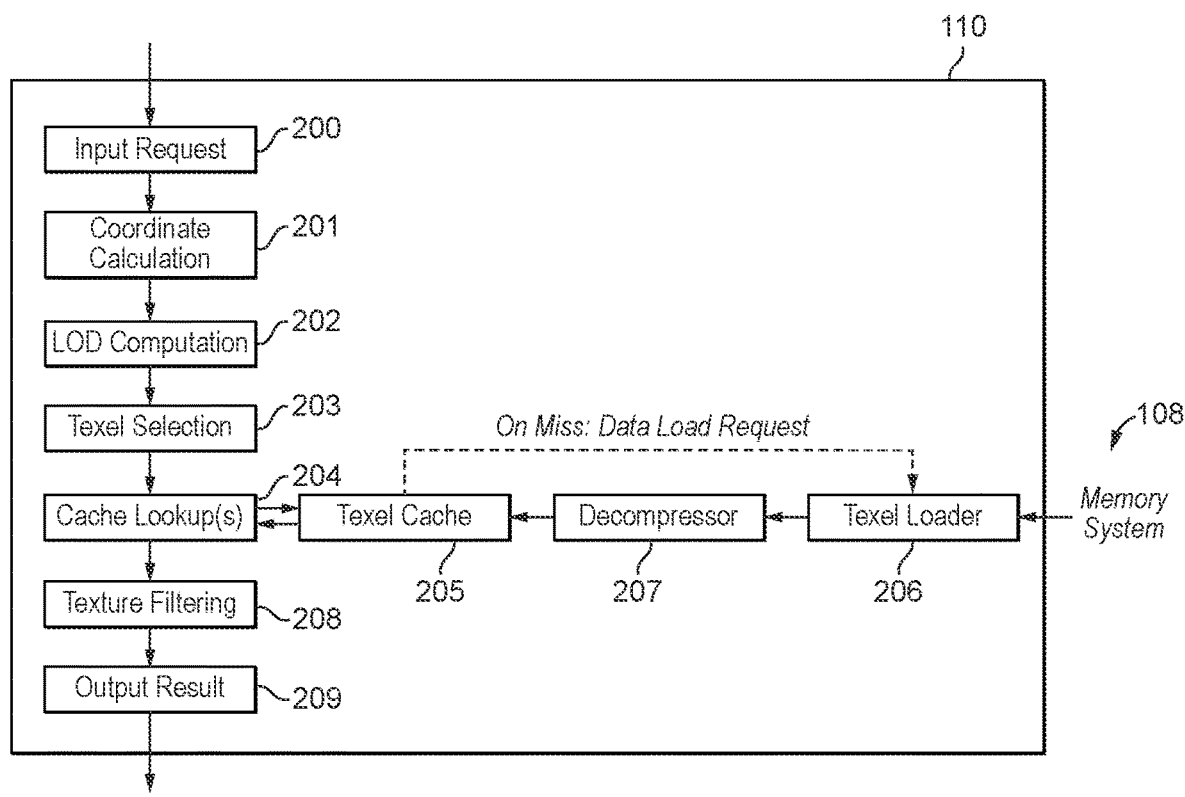
FIG. 5 shows schematically an exemplary graphics texture mapper in more detail.

FIG. 5 shows an exemplary texture mapper (texture mapping apparatus) 110 in more detail.

As shown in FIG. 5, the texture mapper 110 includes a number of processing stages (circuits), including an input request stage (circuit) 200 that accepts texture mapping operation requests from a renderer (e.g. the fragment shader 104 in FIG. 4). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then a level of detail (LOD) computation stage (circuit) 202, that can determine the level of detail at which the texture is to be sampled for the texture mapping operation (this selects the mipmap levels to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204.

As shown in FIG. 5, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 5, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear, trilinear, anisotropic, or any other form of filtering, to generate the desired filtered sample result.

Figure 2:
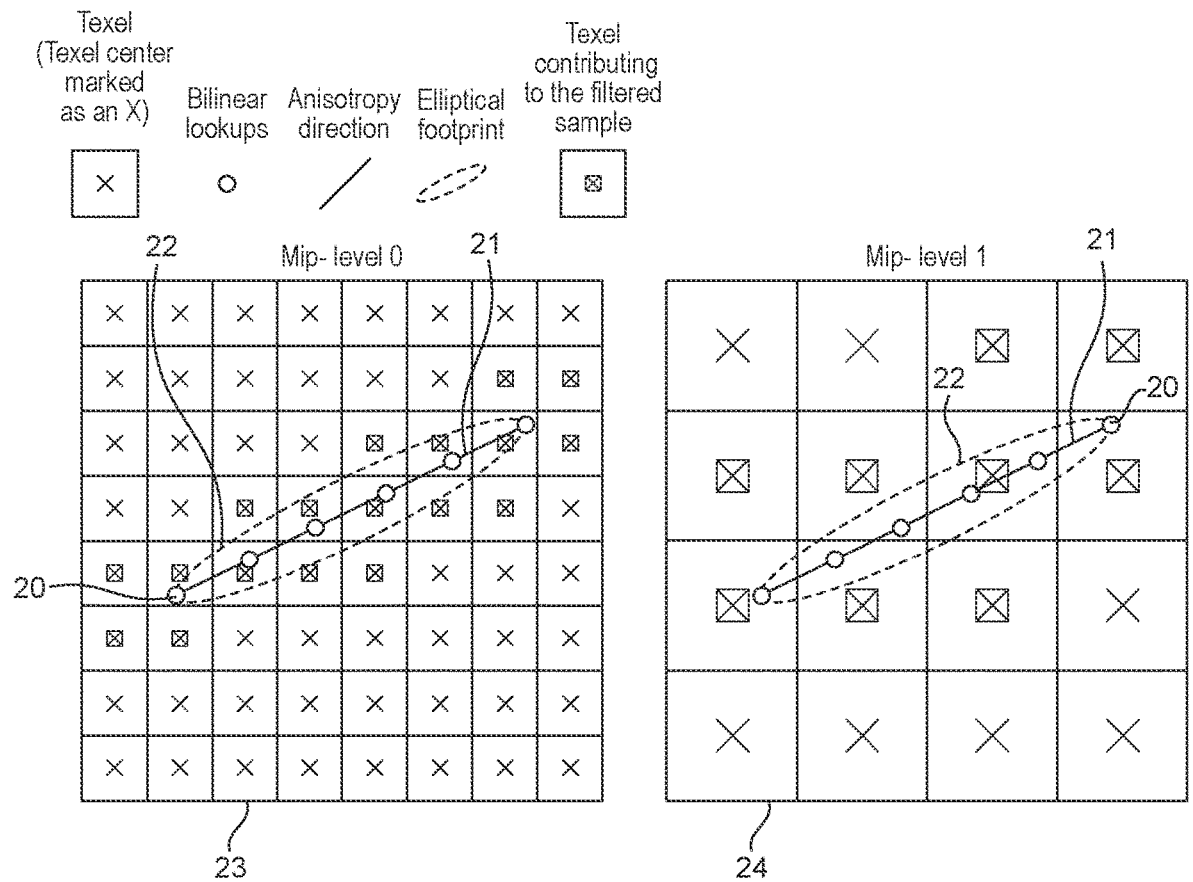
FIG. 2 shows an example of anisotropically sampling two mipmap levels for a texture.

The present embodiments relate in particular to the case where the texture mapper 110 is to perform anisotropic filtering to sample a texture. In this case, as illustrated in FIG. 2, samples may be taken in each of two mipmap levels (comprising a more detailed and a less detailed mipmap level) for positions along a defined anisotropy direction.

In a first embodiment of the technology described herein, rather than taking samples for the same number of positions along the anisotropy direction in both the more detailed mipmap level and the less detailed mipmap level when two mipmap levels are being sampled (as would be the case normally when performing anisotropic filtering of a texture), samples are taken for fewer positions along the anisotropy direction in the less detailed mipmap level than along the anisotropy direction in the more detailed mipmap level.

Figure 6:
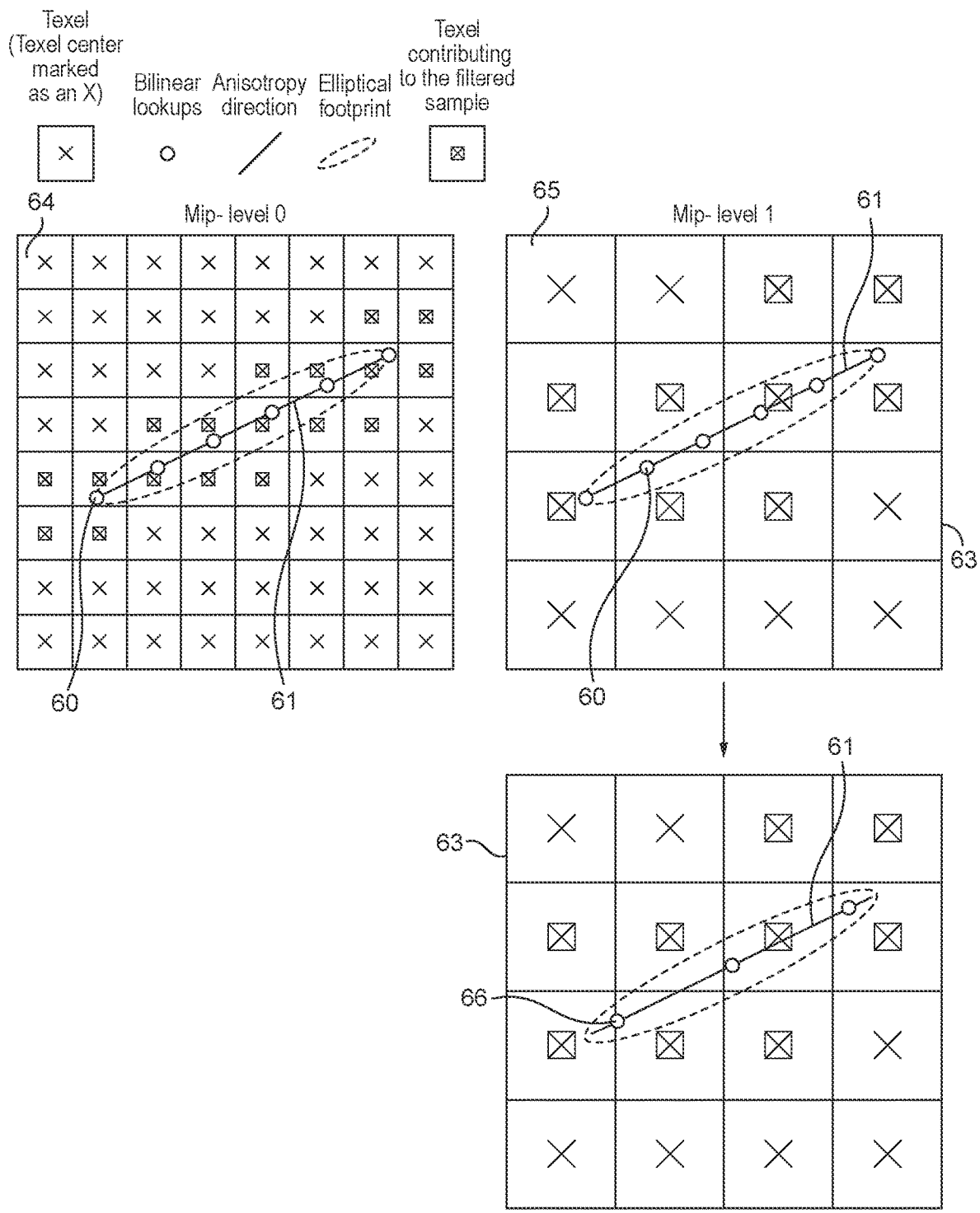
FIG. 6 shows schematically anisotropic filtering of a texture in an embodiment of the technology described herein.

FIG. 6 illustrates this, and shows in its upper part the normal anisotropic filtering process where the same number of positions 60 are sampled along the anisotropy direction 61 in both the more detailed mipmap level 62 and the less detailed mipmap level 63 that are being sampled for the anisotropic filtering process.

FIG. 6 also shows which of the texels 64 in the more detailed mipmap level, and which of the texels 65 in the less detailed mipmap level 63, contribute to the sample that is taken for each position 60 along the anisotropy direction 61. (It is assumed in this regard that for each position along the anisotropy direction that is sampled, a bilinear lookup is made into the mipmap level in question.)

The Applicants have recognised however, that in such an arrangement, sampling all of the positions 60 in the less detailed mipmap level 63 is in fact unnecessary, but rather the same effective output (and in particular a sufficiently similar visual result) can be achieved by sampling at a reduced number of positions 66 along the anisotropy direction 61 in the less detailed mipmap level 63 (as illustrated in the bottom part of FIG. 6). Accordingly, the sample count can be reduced in the less detailed mipmap level without noticeably affecting the rendered result. By reducing the number of positions for which samples are taken in the less detailed mipmap level 63, the processing requirements (e.g. number of processing cycles) for the anisotropic filtering of the texture can be reduced.

Thus in the example illustrated in FIG. 6, rather than taking samples for six positions 60 along the anisotropy direction 61 in the less detailed mipmap level 63, samples are only taken for three positions 66 along the anisotropy direction (but samples are still taken for six positions 60 along the anisotropy direction 61 in the more detailed mipmap level 62). The (in this case bilinear) samples taken at each position 60 in the more detailed mipmap level 62, and at each position 66 in the less detailed mipmap level 63, are then combined appropriately to provide the overall anisotropically filtered output sampled texture value (for, e.g., returning to the fragment shader).

Figure 7:
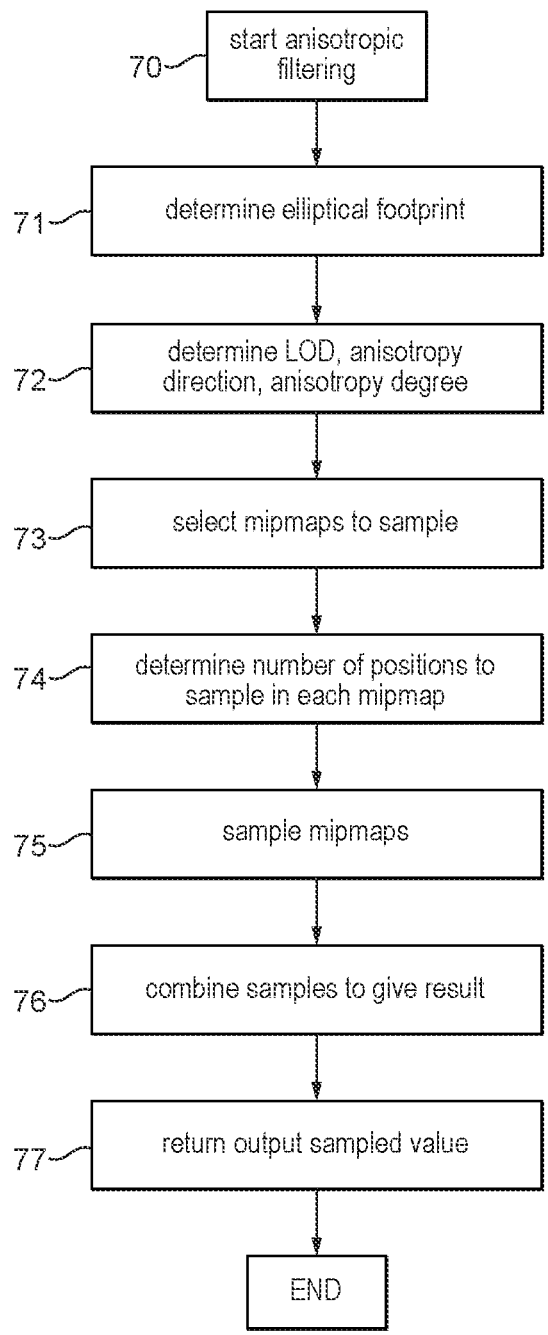
FIG. 7 is a flowchart showing anisotropic filtering in an embodiment of the technology described herein.

FIG. 7 shows the operation of the texture mapper 110 in this embodiment.

As shown in FIG. 7, when anisotropic filtering is to be performed (step 70), the texture mapper will first determine the appropriate parameters for the elliptical footprint that, in effect, corresponds to the projection of the sampling point onto the surface to which the texture is being applied (step 71). In the present embodiment, this operation determines a length and direction for the major axis, and a length for the minor axis, of the elliptical footprint within the coordinate system of the texture, using the derivatives of the texture coordinate(s) to be sampled.

The determined elliptical footprint (the parameters for the ellipse) are then used to determine a level of detail (LOD) at which to sample the texture, the anisotropy direction along which the texture will be sampled, and an "anisotropy degree", which represents a base number of positions to sample along the anisotropy direction in the texture (step 72).

In the present embodiment, the "final" level of detail (Final_LOD) at which the texture is to be sampled is determined from the determined length of the minor axis of the projected ellipse for the sampling point, together with any level of detail bias, and level of detail high and low clamps, that have been set, and any level of detail adjustments, such as rounding, to be applied based on a specified "mipmap mode", as follows:

Raw_LOD=compute_anisotropic_LOD;

Biased_LOD=raw_LOD+LOD_bias;

Clamped_LOD=max(LOD_low_clamp,min(biased_LOD,LOD_high_clamp));

where:

compute_anisotropic_LOD is the "raw" level of detail determined for the anisotropic filtering based on a determined length for the minor axis of the elliptical footprint that is estimated as the projection of the sampling point onto the surface to which the texture being sampled is to be applied;

LOD_bias is the value of the LOD bias (if any) that has been set;

LOD_low_clamp is the LOD low clamp, if any, that has been set; and

LOD_high_clamp is the LOD high clamp, if any, that has been set.

(It is assumed here that a smaller level of detail value implies a higher level of detail (thus level of detail "0" is the highest level of detail (the most detailed mipmap level)).

In the present embodiments, in addition to being able to set a level of detail bias and level of detail high and low clamps as discussed above, the system supports two different "mipmap modes" of operation, one in which the "Clamped_LOD" as determined above is used as the "final" level of detail (Final_LOD) at which the texture is sampled (and in which samples from the two mipmap levels are linearly interpolated based on the fractional level of detail) (which may be referred to as a "linear" mipmap mode), and one in which the Clamped_LOD determined as set out above is rounded to the nearest integer value to provide the "final" level of detail (Final_LOD) at which the texture is sampled (such that only one mipmap level will be sampled, corresponding to that integer final level of detail) (which may be referred to as a "nearest" mipmap mode).

The mipmap mode to be used (linear or nearest in the present embodiments) for any given texture sampling operation may be specified in the present embodiments by the application that requires the graphics processing, and/or by the driver for the graphics processor.

Other arrangements, such as also or instead using other, different mipmap modes would, of course, be possible.

The anisotropy direction along which to take the samples is determined as the (direction of the) major axis of the determined elliptical footprint of the sampling point in the texture.

The anisotropy degree is determined as the ratio of the length of the major axis of the estimated projected ellipse for the sampling point to the length of the minor axis of the projected ellipse for the sampling point (and, in effect, represents a "raw" number of positions that it would be desirable to sample at the "raw" level of detail determined based on the projected ellipse (discussed above)).

Once the level of detail at which to sample the texture, the anisotropy direction, and anisotropy degree have been determined, the mipmaps to sample for the texture are selected (step 73). The mipmaps to sample are selected in accordance with the Final_LOD (level of detail value) determined as discussed above, and in the case of a fractional Final_LOD, will correspond to a mipmap level that is more detailed (i.e. comprises a higher resolution version of the texture) than the final level of detail, and another mipmap level that comprises a less detailed (a lower resolution) version of the texture than the final level of detail.

It is then determined how many positions should be sampled in each mipmap (step 74).

In the present embodiment, the number of positions to sample in each mipmap level is determined as follows:

//increased sample (position) count in mip0 (the more detailed mipmap level)

sample_count_mip0=base_aniso_degree×pow(2.0, Final_LOD−floor(Final_LOD));

//reduced sample (position) count in mip1 (half as many positions in mip1) (the less detailed mipmap level)

sample_count_mip1=base_aniso_degree×pow(2.0, Final_LOD−floor(Final_LOD)−1.0);

where:

mip0 is the more detailed mipmap level;

sample_count_mip0 is the number of positions to sample in the more detailed mipmap level;

mip1 is the less detailed mipmap level;

sample_count_mip1 is the number of positions to sample in the less detailed mipmap level;

base_aniso_degree is a base determined number of positions to be sampled; and final_LOD is the "final" level of detail that is used to determine which mipmap levels to sample from (i.e. after any adjustments (e.g. rounding) (if any) have been applied).

(Again, it is assumed here that a smaller level of detail value implies a higher level of detail.)

In one embodiment, the base anisotropy degree (number of positions) to sample is the "raw" anisotropy degree determined as discussed above (i.e. as the ratio of the length of the major axis to the length of the minor axis of the estimated elliptical projection of the sampling point onto the surface to which the texture is being applied).

However, as will be discussed further below, in other embodiments the "base" anisotropy degree may be different to that raw anisotropy degree.

This has the effect of setting a higher number of positions to sample in the more detailed mipmap level than in the less detailed mipmap level, and such that the positions in each mipmap level can be spaced one texel apart (at least in the case where the mipmap levels vary in their resolution by a power of 2).

Once the number of positions along the anisotropy direction for which samples should be taken for each mipmap level has been determined, then samples for the determined number of positions are taken in the mipmap level in question (step 75).

As illustrated in FIG. 6, in the present embodiment, the positions that are sampled are spaced one texel apart along the length of the major axis of the projected elliptical footprint in the texture. In this embodiment, as shown in FIG. 6, a single bilinear sample is taken at each position along the major axis of the ellipse that is to be sampled.

It will be appreciated that in this embodiment, it may be determined that samples should be taken for a non-integer number of positions in one or both of the two mipmap levels. In such a case, the number of positions to sample could simply be rounded to the nearest integer (or the nearest highest integer, or the nearest lowest integer, as desired.)

However, in the case where the texture mapper supports taking fractional samples from a texture, then that operation is in an embodiment used to take samples for the desired non-integer number of positions in the mipmap level or levels in question.

In the present embodiments, in the case of a non-integer number of positions to be sampled (a sample count) having a value between 1 and 2, then two positions are sampled, that, in effect, "start" at the same position (both at the centre of the ellipse) for a sample count of 1, and gradually move apart until they are exactly one texel apart (spanning the centre of the ellipse) when the sample count reaches 2. For sample counts (number of positions to be sampled) above 2, two new positions to be sampled are added, one on either side of the existing two as the sample count exceeds 2, each a distance of one texel from the next, with the outer positions (samples) starting out with an interpolation weight close to 0 (for a sample count close to 2) but which gradually increases to 0.25 as the sample count (number of positions to be sampled) reaches 4.

The table below illustrates the interpolation weights and distances between the sample positions as the number of positions to be sampled increases from 1 to 6 in the present embodiments:

| Sample Count | Sample distance | Weight sample − 2.5 | Weight sample − 1.5 | Weight sample − 0.5 | Weight sample 0 | Weight sample + 0.5 | Weight sample + 1.5 | Weight sample + 2.5 |
|---|---|---|---|---|---|---|---|---|
| 1.0 | 0.0 | | | | 100% | | | |
| 1.1 | 0.1 | | | 50% | | 50% | | |
| 1.75 | 0.75 | | | 50% | | 50% | | |
| 2.0 | 1.0 | | | 50% | | 50% | | |
| 2.5 | 1.0 | | 10% | 40% | | 40% | 10% | |
| 3.0 | 1.0 | | 17% | 33% | | 33% | 17% | |
| 4.0 | 1.0 | | 25% | 25% | | 25% | 25% | |
| 5.0 | 1.0 | 10% | 20% | 20% | | 20% | 20% | 10% |
| 6.0 | 1.0 | 16% | 17% | 17% | | 17% | 17% | 16% |

(It should be noted that the sample position indexing in this table (−2.5, −1.5, −0.5, 0, +0.5, +1.5, +2.5) is because the sampling positions are centred on the ellipse centre and are spaced from each other by one texel.)

It will be noted from this table that as the interpolation weights of the "outer", positions (samples) progressively increase, the interpolation weights of the "inner" positions (samples) progressively decrease, so as to provide a smoother transition as the sample count (number of positions to sample) increases.

Once the samples in the more and less detailed mipmap levels have been taken, then those samples are used (combined) to provide an output sampled texture value for use by the (fragment shader of the) graphics processor (step 76).

In the present embodiment, for each mipmap level independently, the samples taken in the mipmap level are combined appropriately, as set out above, according to the determined sample count (number of positions to be sampled) in the mipmap level in question, to provide a combined sample value for the mipmap level in question.

Thus, for each mipmap level, a weighted average of the samples is generated (based on the distances of the samples (positions) along the anisotropy direction from the centre of the major axis of the projected ellipse).

Then, the resulting values for each mipmap level are linearly interpolated according to the fractional LOD value (i.e. based on the distance of the mipmap level in question from the actual level of detail that it was desired to sample the texture at), to provide the final, overall output sampled texture value.

In general the weighting of the samples based on their distance from the centre of the projected ellipse could follow, e.g., a linear function with distance from the centre of the ellipse, or more sophisticated functions (weight distributions) could be used, such as following a Gaussian function or some approximation of a Gaussian function, etc. Similar arrangements may be used for the interpolation between mipmap levels.

Other arrangements would, of course, be possible.

Once the output sampled texture value has been determined, that value is returned to the fragment shader for use (step 77).

As discussed above, and as illustrated in FIG. 6, the Applicants have recognised that a reduced number of positions can be sampled in a less detailed mipmap level when performing anisotropic filtering, without (significantly) affecting the output result.

The Applicants have further recognised that the idea of sampling fewer positions in a texture without significantly affecting the output result would apply more generally, and in particular in the case where the "final" level of detail at which a texture is sampled is a less detailed version of the texture than any initial, "raw" level of detail that is determined based on the elliptical projection of the sampling point onto the surface to which the texture is applied indicates, i.e. where an "effective level of detail bias", defined as:

effective_LOD_bias=Final_LOD−raw_LOD;

where Final_LOD and raw_LOD are defined as above, is positive (greater than 0) (with the assumption that a smaller level of detail value indicates a more detailed mipmap level).

This may arise, for example, where there is a positive level of detail bias set by the application that requires the graphics processing.

Thus, in an embodiment of the technology described herein, the number of positions that are sampled in a texture is reduced (relative to the number of positions that might normally be sampled) in the case where the "final" level of detail for which the texture is sampled is a less detailed version of the texture than the initial, "raw" level of detail that is determined based on the elliptical projection of the sampling point onto the surface to which the texture is applied indicates.

This then facilitates a reduced amount of processing for the texture sampling (as the number of positions being sampled can be reduced), whilst still achieving the same (visual) output when sampling the texture.

This can be done both in the case above where two mipmap levels are being sampled (with a relatively reduced number of positions being sampled in one or both of those mipmap levels), but could equally be done where only a single version (mipmap level) of the texture is being sampled.

Figure 8:
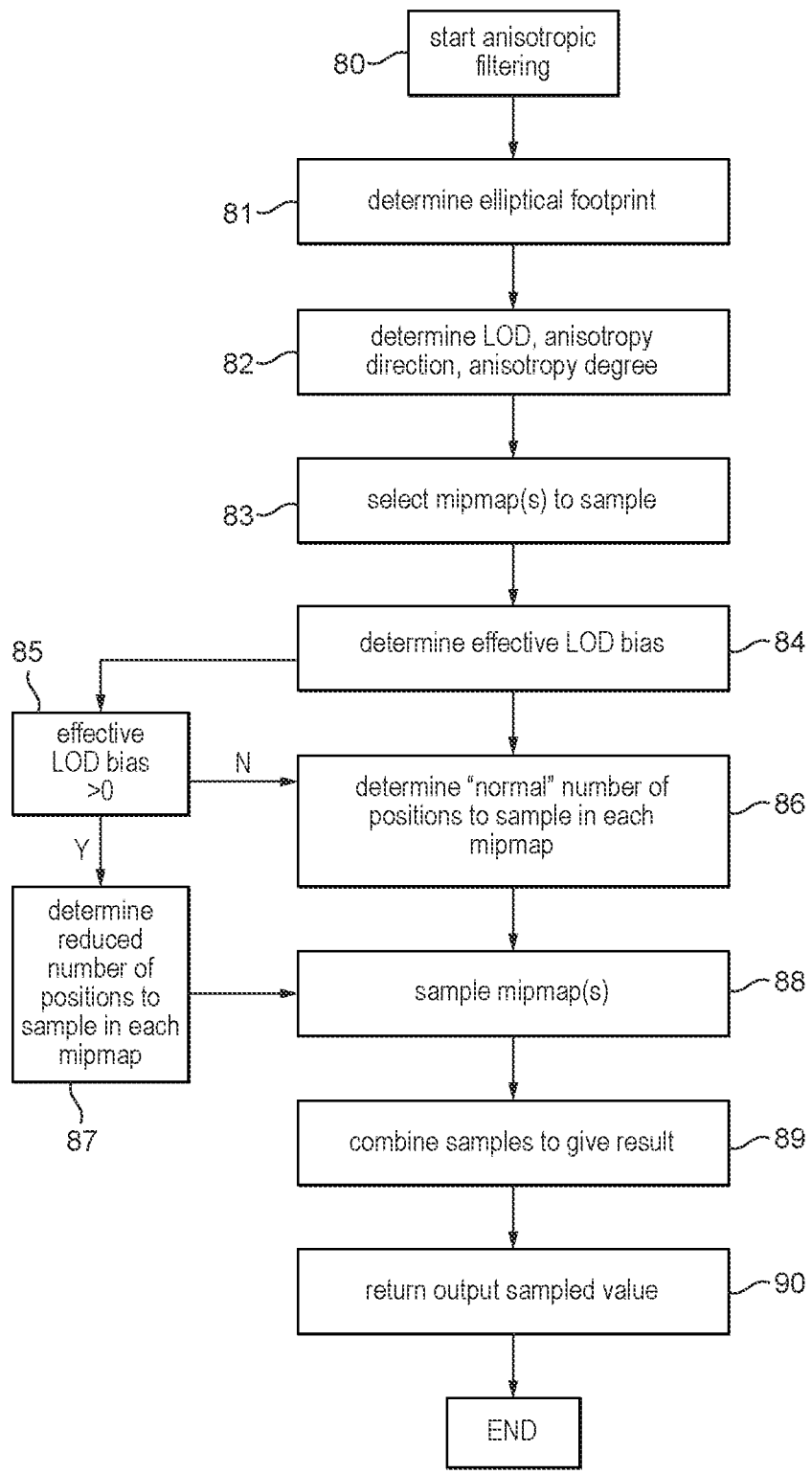
FIG. 8 is a flowchart showing anisotropic filtering of a texture in another embodiment of the technology described herein.

FIG. 8 shows the operation of the texture mapper 110 in this embodiment.

As shown in FIG. 8, again the initial part of the anisotropic filtering process determines the elliptical footprint in the texture for the sampling point for which the texture is being sampled, and an appropriate level of detail, anisotropy direction and anisotropy degree from that elliptical footprint (and any other parameters that have been set) (steps 80, 81 and 82).

Then, one or more mipmaps at which to sample the texture will be selected based on the determined level of detail (step 83).

The effective level of detail bias (as specified above) is then determined (step 84), and used to determine the number of positions to sample in each mipmap that is being sampled (which may only be a single mipmap, as discussed above) (steps 85, 86, and 87).

In the present embodiment, the effective level of detail bias is used to select and set a "base" number of positions to be sampled as follows:

If (effective_LOD_bias is >0.0)
{ base_aniso_degree=raw_aniso_degreexpow(2.0,−effective_LOD_bias);

}
else
{
base_aniso_degree=raw_aniso_degree;
}
where effective_LOD_bias=Final_LOD−raw_LOD (as discussed above);

raw_aniso_degree is the anisotropy degree (number of positions to sample) along the anisotropy direction determined as the ratio of the length of the major axis to the length of the minor axis of the estimated elliptical footprint in the texture; and base_aniso_degree is a "base" anisotropy degree (number of positions to sample) that will be used as and/or to determine the number of positions to sample along the anisotropy direction in the texture.

(This again assumes that a lower level of detail value implies a more detailed mipmap level, and vice-versa.)

It can be seen that this will determine a "base" anisotropy degree that corresponds to the "raw" anisotropy degree determined as the ratio of the length of the major axis to the length of the minor axis of the elliptical footprint in the texture in the case where the effective level of detail bias is equal to or less than 0, but in the case where the effective level of detail bias is positive (is greater than 0) a "base" anisotropy degree that is less than the "raw" anisotropy degree will be provided. Thus, this arrangement will reduce the number of positions to sample where there is a positive effective level of detail bias. For example, an effective level of detail bias of "+1" will halve the number of positions that are sampled relative to the "raw" anisotropy degree.

The so-determined "base" anisotropy degree is then used to determine the actual number of positions to sample in the texture. For example, the actual number of positions to sample could simply be set to the "base" anisotropy degree itself, or the so-determined "base" anisotropy degree could be used as the base anisotropy degree from which the numbers of positions to sample in each of two mipmap levels are determined in the manner discussed above.

Once the number of positions to sample along the anisotropy direction have been determined in this manner, then that number of positions in the mipmap or mipmaps will be sampled, those samples combined appropriately, and the output sampled value returned to the fragment shader for use (steps 88, 89 and 90).

The Applicants have further recognised that the operation of this embodiment of reducing the number of positions at which the texture is sampled when performing anisotropic filtering in the case of a positive effective LOD_bias can be used to help to control the frame generation rate, e.g. in situations where a guaranteed minimum frame rate is desired, such as in VR or AR applications. In this case, if the application (and/or driver for the graphics processor) sees that the frame rendering time is exceeding some threshold, then the application (and/or driver) could increase the LOD_bias so as to increase the effective LOD_bias in a positive direction, so as to thereby trigger a reduced amount of sampling in the texture (and correspondingly therefore reduce the time that it takes to generate a frame).

Figure 9:
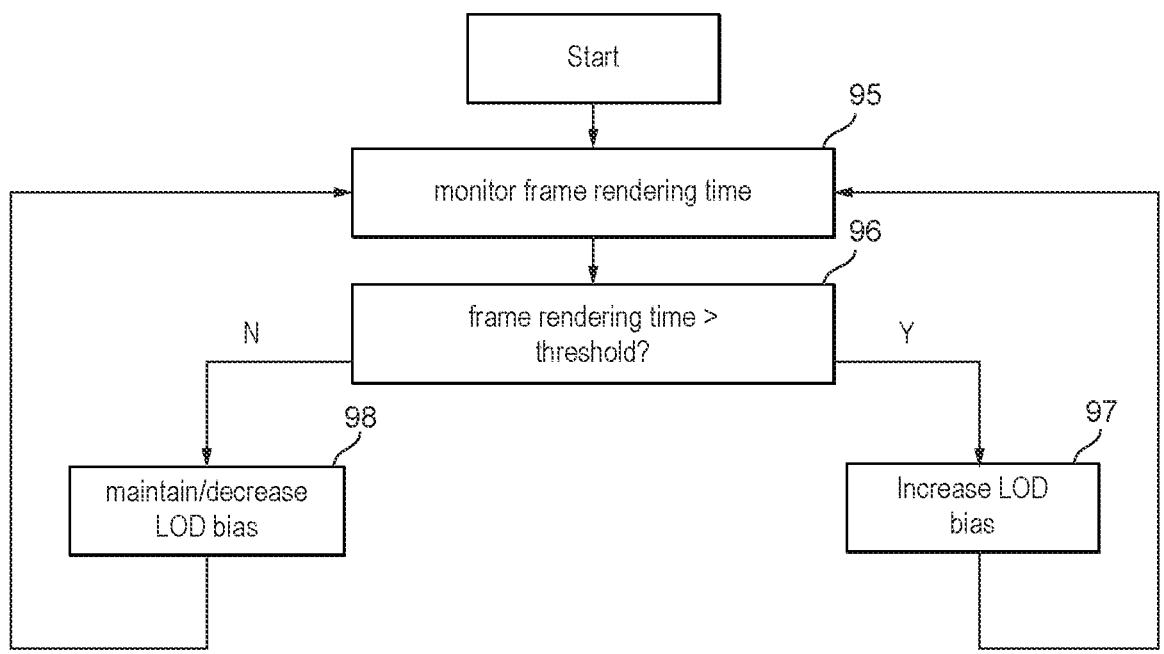
FIG. 9 is a flowchart showing the setting of a level of detail bias in an embodiment of the technology described herein.

FIG. 9 illustrates this operation and shows the application and/or driver monitoring the frame rendering time (the time taken to render a frame) (step 95), and then determining whether the frame rendering time exceeds a threshold time or not (step 96).

When the frame rendering time exceeds the threshold, the application and/or driver increases the LOD_bias (step 97).

On the other hand, if the frame rendering time does not exceed the threshold, then the existing LOD_bias could be maintained, or the LOD_bias could be decreased (e.g. to a limit of 0) (step 98). In this case, if the LOD_bias has already been increased because the frame rendering time exceeded a threshold, then when the frame rendering time falls below a, e.g. different, threshold, the LOD_bias could be decreased again.

In this way, the LOD_bias that is being used would be varied based on, and so as to help to control, the frame rendering time.

The LOD_bias as set in this manner would then be used in the "final" LOD calculation in step 82 in the process set out in FIG. 8, so as to thereby effectively vary the "effective LOD_bias", and thus the number of positions that will be sampled in the texture, depending on the frame rendering time.

The above embodiment relates to the situation where the level of detail (the final level of detail) at which the texture is sampled is less detailed than the initial, "raw" level of detail that is determined based on the elliptical projection of the render output sampling point onto the surface to which the texture is to be applied.

The Applicants have further recognised that the converse situation can arise, i.e. where the final level of detail at which the texture is sampled samples a more detailed version of the texture than the initial, "raw" level of detail that is determined based on the elliptical projection of the sampling point onto the surface to which the texture is to be applied, i.e. where the "effective level of detail bias" as defined above is negative (less than 0) (again with the assumption that a smaller level of detail value indicates a more detailed mipmap level).

In this case, the texture will, in effect, be being sampled at a mipmap level that is too detailed, which can cause aliasing and bad image quality. For example, if the effective level of detail bias is −1, then the resolution of the mipmap being sampled would be twice as large in both width and height as compared to the raw level of detail. That would then cause the texture sample positions to be spaced two texels apart in the mipmap level being sampled, which would cause every second texel to be skipped. This could potentially cause aliasing (for example, in the case of a "chessboard" texture, skipping every texel would create a fully black or fully white result whereas a grey result is desirable).

This may happen if a negative level of detail bias is specified by the application, or if the level of detail high clamp is set to a low value (which may be done, e.g., in the relatively common case where mipmaps are not present (so as to force the texture sampling to be done from the most detailed (and only) version of the texture)).

Thus, in an embodiment of the technology described herein, where the "final" level of detail for which the texture is sampled is a more detailed version of the texture than the initial "raw" level of detail that is determined based on the elliptical projection of the sampling point onto the surface to which the texture is applied indicates, each position along the anisotropy direction for which the texture is to be sampled is "supersampled" (i.e. a plurality of (in an embodiment bilinear) samples are taken for each position along the anisotropy direction for which the texture is to be sampled), rather than simply taking a single (bilinear) sample in the texture at each position along the anisotropy direction for which the texture is to be sampled.

When performing such supersampling, the plural number of samples that are taken for each position along the anisotropy direction are arranged in an appropriate supersampling pattern (such as a 2×2 or 4×4 pattern of samples), and with an appropriate distribution and spacing along the x and y axes in the texture.

The plural samples that are taken for each position along the anisotropy direction for which the texture is to be sampled are then combined appropriately to provide a result sample value for the position being sampled (e.g. using a further bilinear filtering operation in the case of a 2×2 supersampling pattern).

Figure 10:
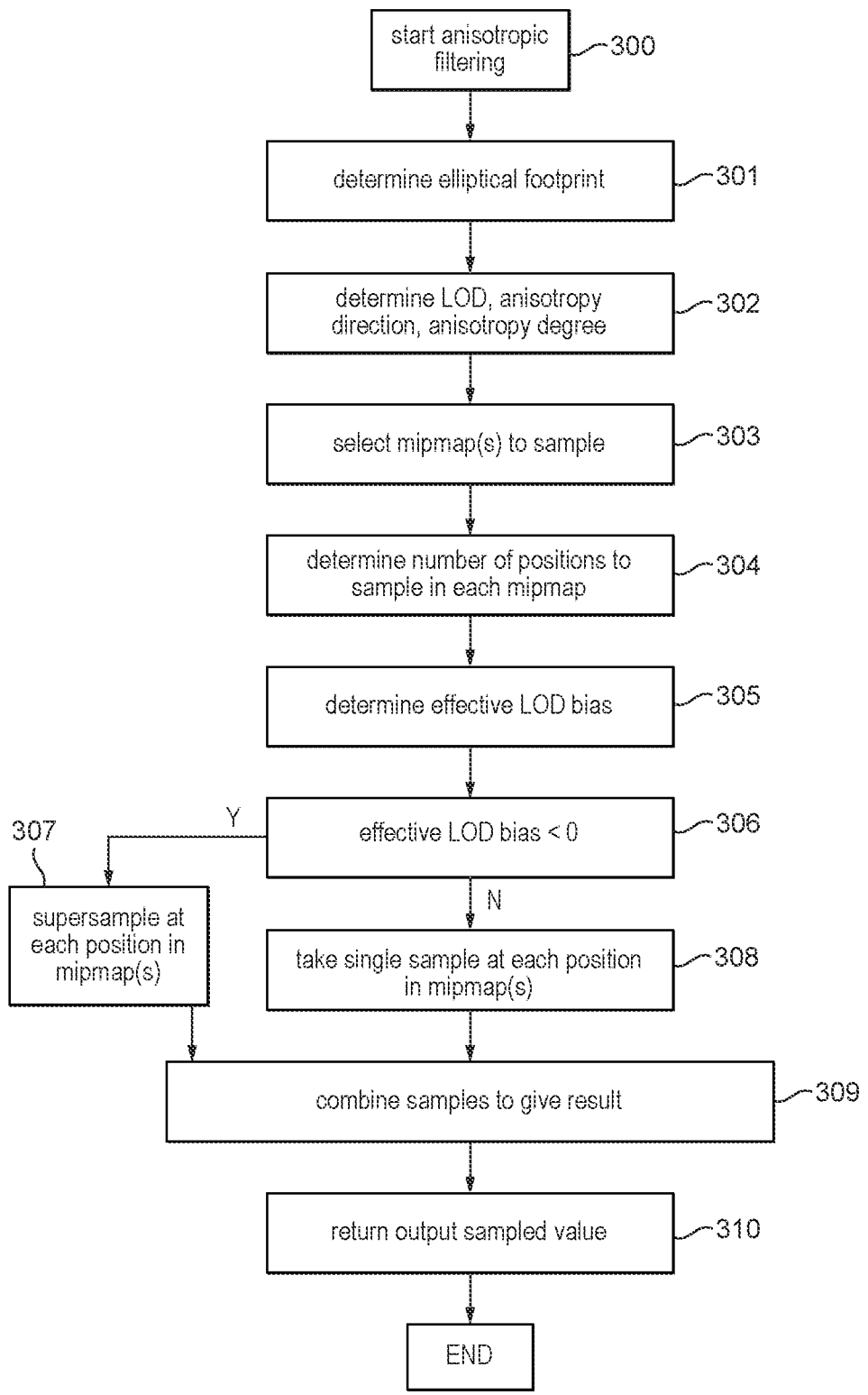
FIG. 10 is a flowchart showing anisotropic filtering of a texture in another embodiment of the technology described herein.

FIG. 10 shows the operation of the texture mapper 110 in this embodiment.

As shown in FIG. 10, again the initial part of the anisotropic filtering process determines the elliptical footprint in the texture for the sampling point for which the texture is being sampled, and an appropriate level of detail, anisotropy direction, and anisotropy degree from that elliptical footprint (and any other parameters that have been set) (steps 300, 301 and 302).

Then one or more mipmaps in which to sample the texture are selected based on the determined level of detail (step 303).

A number of positions to sample in the mipmap or mipmaps that are to be sampled is then determined, e.g. and in an embodiment, in the manner of one of the preceding embodiments (step 304).

The effective level of detail bias (as specified above) is then determined (step 305), and used to determine how many samples to take for each position being sampled in each mipmap that is being sampled (which may only be a single mipmap) (steps 306, 307 and 308).

In this embodiment, the effective level of detail bias is used to select and set a "supersampling degree" that represents, and is used to determine, a number of samples (the "supersampling pattern") (in the x and y directions (along the x and y axes)) that is taken for each position along the anisotropy direction for which the texture is to be sampled, as follows:

if (effective_LOD_bias<0)
{
    supersampling_degree=pow(2.0,−effective_LOD_bias);
}
else
{
    supersampling_degree=1.0; //this effectively disables supersampling
}
where
    effective_LOD_bias=Final_LOD−raw_LOD (as discussed above);
and
supersampling_degree is the number of samples to take along the x and y axes in the texture for each position along the anisotropy direction that is to be sampled.

(This again assumes that a lower level of detail value implies a more detailed mipmap level, and vice-versa.)

This will accordingly cause only a single (bilinear) sample to be taken for each position where the effective level of detail is 0 or greater (since the supersampling degree is then set to 1) (step 308 in FIG. 10), but will "supersample" each position when there is a negative effective level of detail bias (step 307 in FIG. 10).

Once it has been determined whether each position in the mipmap or mipmaps should be supersampled or not, then either a single sample or a supersampling pattern of samples are taken at each position that is to be sampled in the mipmap or mipmaps, as appropriate (steps 307 and 308), the samples are combined appropriately, and the output sample value returned to the fragment shader for use (steps 309 and 310).

It should be noted here, that in the case where samples are to be taken in two mipmap levels, then such "supersampling" is in an embodiment done in both mipmap levels, but subject to the same relative scaling of positions to be sampled as discussed above, such that, for example, and in an embodiment, half as many positions will be "supersampled" in the less detailed mipmap level than in the more detailed mipmap level. (Since the "supersampling" effectively increases the sample count in two dimensions, "supersampling" half as many positions in the less detailed mipmap level will in practice result in one quarter as many samples being taken in the less detailed mipmap level in the common case of a 2D-texture.)

It will be appreciated from the above that as the effective level of detail bias becomes increasingly negative, the supersampling degree will correspondingly progressively increase, indicating that a greater number of samples should be taken for each position that is to be sampled.

Figure 11:
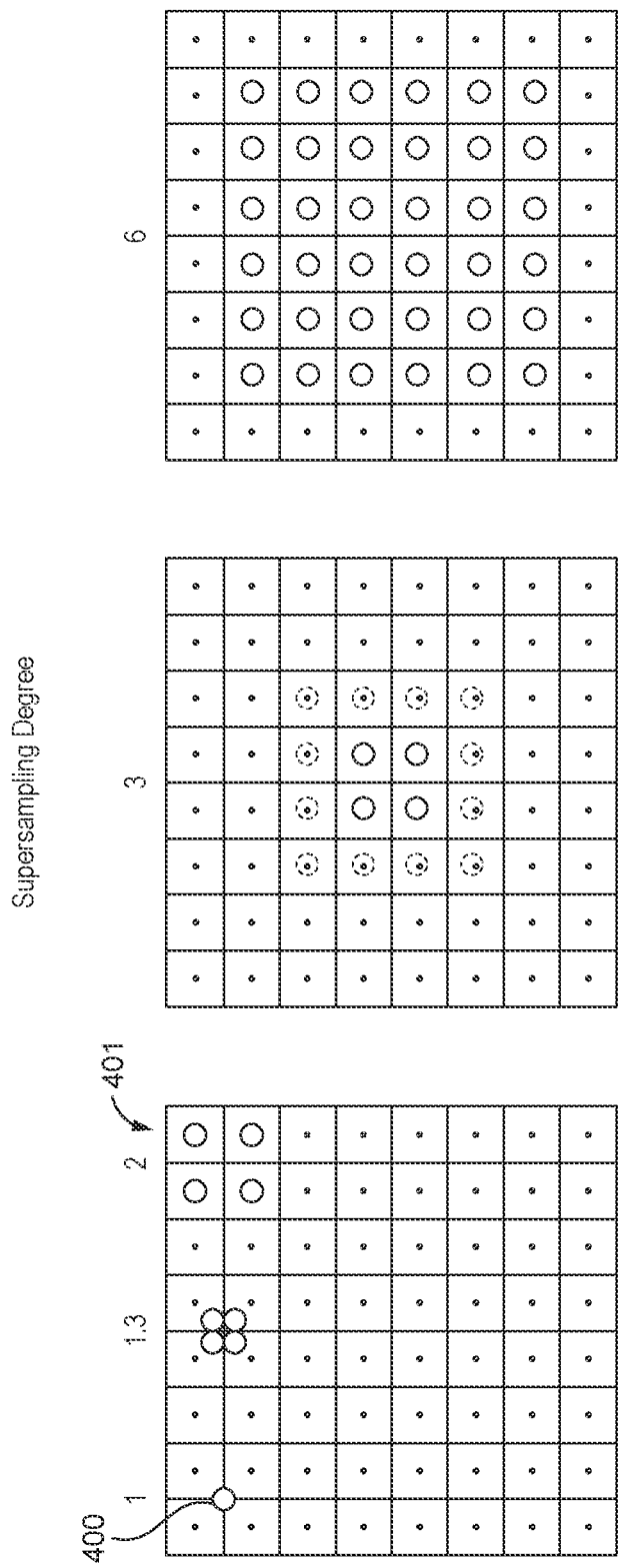
FIGS. 11 and 12 illustrate the supersampling arrangement of the embodiment of FIG. 10.
Figure 12:
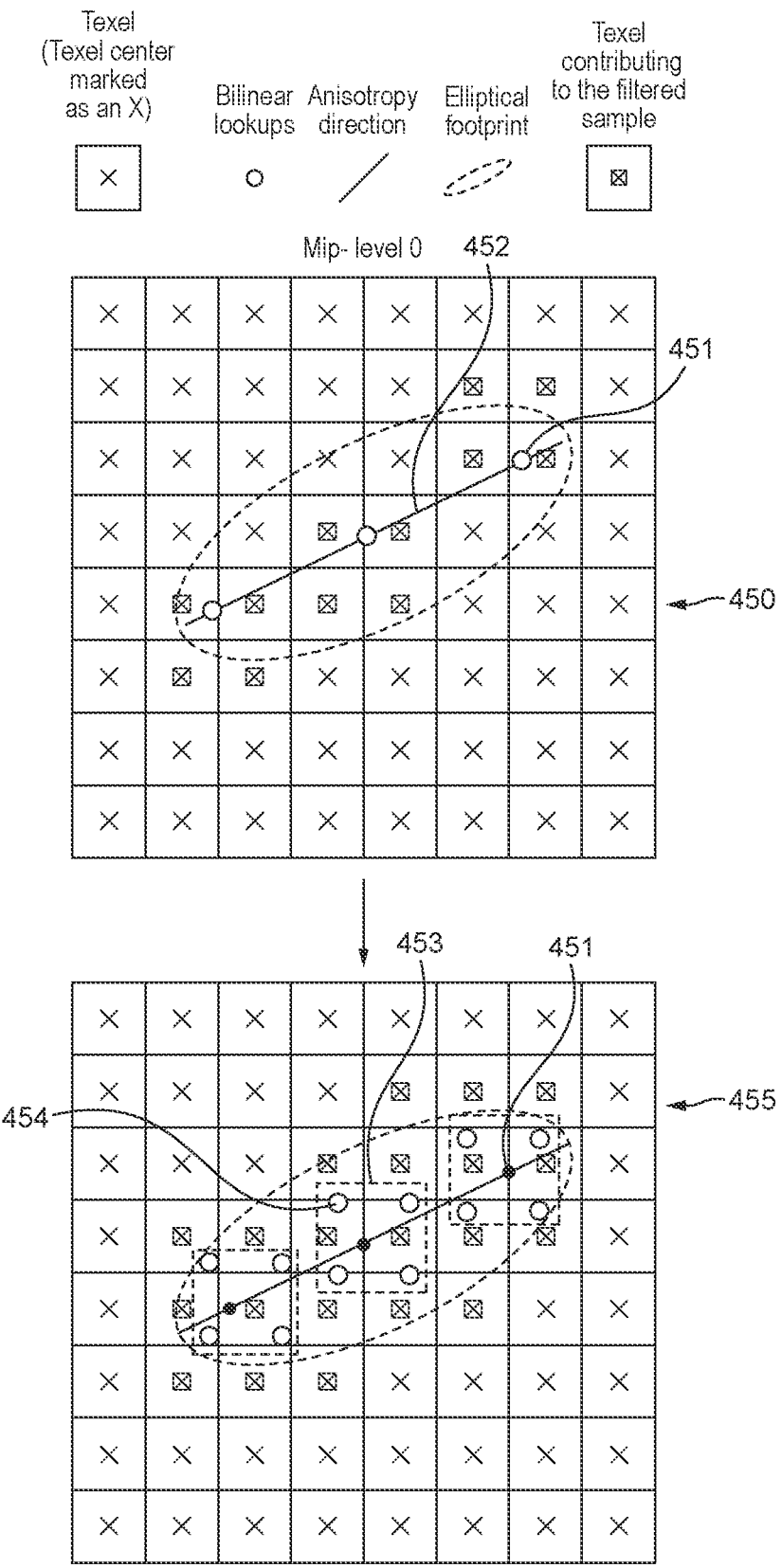

FIGS. 11 and 12 illustrate this.

FIG. 11 shows how the determined supersampling degree controls the number, spacing and weighting (contributions) of the samples that are taken at each position along the anisotropy direction.

FIG. 12 illustrates performing "supersampling" at each position to be sampled along the anisotropy direction.

As shown in FIG. 11, for a supersampling degree of 1, a single (e.g. bilinear) sample 400 will be taken at each position to be sampled, then as the "supersampling degree" increases from 1 to 2, the single texture sample will split into 2×2 (bilinear) samples that gradually move apart, until at a supersampling degree of 2, 2×2 (bilinear) texture samples 401, spaced one texel apart (in the x and y directions), will be taken for each position along the anisotropy direction for which the texture is to be sampled.

For supersampling degrees higher than 2, extra (bilinear) samples fade in around the border of the existing samples.

For supersampling degrees higher than 2, the next highest (multiple of 2) integer supersampling pattern is used (so a 4×4 supersampling pattern as the supersampling degree increases above 2, for example), with the samples always being spaced one texel apart, but with the interpolation weights for the additional, "outer" samples being progressively increased (and the interpolation weights for the inner "core" samples correspondingly being decreased), as the supersampling degree increases, such that the extra samples will fade in around the border of the existing samples as the supersampling degree increases.

For example, for a supersampling degree of 2.1, 4×4 samples will be taken, but the outer "ring" of samples will be set to have a very low interpolation weight, for example as illustrated in the table below (which shows the interpolation weights for each sample in the 4×4 pattern for a supersampling degree of 2.1 in the present embodiments):

| 0.1% | 1.1%  | 1.1%  | 0.1% |
|------|-------|-------|------|
| 1.1% | 22.7% | 22.7% | 1.1% |
| 1.1% | 22.7% | 22.7% | 1.1% |
| 0.1% | 1.1%  | 1.1%  | 0.1% |

(As the supersampling degree increases above 2.1, the weighting of the outer samples will progressively increase, and the weighting of the inner samples will progressively decrease.)

FIG. 12 correspondingly illustrates performing supersampling in each position to be sampled along the anisotropy direction in a mipmap level.

The upper mipmap illustration 450 in FIG. 12 shows three positions 451 to be sampled along the anisotropy direction 452 in the mipmap level in question. In this case, for a supersampling degree of 2, rather than taking a single bilinear sample at each position 451 along the anisotropy direction 452 that is to be sampled, a 2×2 supersampling pattern of bilinear samples will be taken instead.

The lower mipmap illustration 455 in FIG. 12 shows this, and shows in particular taking a 2×2 supersampling pattern 453 of bilinear samples 454 at each position 451 along the anisotropy direction that is to be sampled.

Thus, 2×2 bilinear samples are taken per position to be sampled, instead of only one bilinear sample. As can be seen from FIG. 12, this reduces any aliasing, since the bilinear samples are now spaced one texel or less apart, and cover a greater area of the projected elliptical footprint in the texture.

The Applicants have appreciated that where each position along the anisotropy direction for which the texture is to be sampled is being "supersampled" in the above manner, then that will increase the processing requirements for sampling the textures. That being the case, in an embodiment, this supersampling operation can be selectively enabled and/or constrained by the application that requires the graphics processing and/or the driver for the graphics processor. In this case, the application and/or driver could set a maximum permitted supersampling degree and/or fix the supersampling degree to a value of 1 (so as to disable any supersampling).

In an embodiment, the texture mapper supports the operation and operates in the manner shown in both FIGS. 8 and 10, and thus will operate to determine the number of samples to position in each mipmap in the manner shown in FIG. 8, and then whether those positions should be supersampled or not in the manner described with reference to FIG. 10.

As discussed above, the present embodiments use the length and direction of the major axis, and the length of the minor axis, of the estimated elliptical projection of the sampling point (pixel) to which the texture is to be applied onto the texture, to determine, inter alia, how many samples are to be taken in the texture, and where those samples should be taken from.

In the present embodiment, this is done in accordance with the techniques described in: Paul S. Heckbert, Fundamentals of Texture Mapping and Image Warping (Masters thesis), Report No. UCB/CSD 89/516, Computer Science Division, University of California, Berkeley, June 1989, the entire contents of which is incorporated herein by reference.

Thus, in the present embodiments, a parametric circle in one coordinate system:

$$p=(x,y)=(\cos t, \sin t)$$

is used to represent a circular pixel on the "screen", with x and y representing the horizontal axis and vertical axis of the "screen", respectively. It is then assumed that this circle p is transformed to another coordinate system (the coordinate system of the texture, u, v) using a linear transform (matrix) M so that:

$$p' = pM = (u \quad v) = (\cos t \quad \sin t)\begin{pmatrix} u_x & v_x \\ u_y & v_y \end{pmatrix}$$

Such a linear transform transforms the circle in the first coordinate-system to an ellipse in the second coordinate system. The ellipse is centered on origo (0, 0) and passes through the points (ux, vx) and (uy, vy) (and these points correspond to parameter vaues t with a 90 degree phase difference).

This means that in the first coordinate system (the screen) the point (ux, vx) can be seen as the texture-coordinate of the neighboring pixel to the right and (uy, vy) can be seen as the texture coordinate of the neighboring pixel below the "current" pixel (the pixel for which the texture is to be sampled) on the screen, assuming that the "current" pixel has a texture-coordinate of (0, 0). (In other words, (ux, vx) is the partial derivative of the texture-coordinate in the X-direction on the screen and that (uy, vy) is the partial derivative of the texture-coordinate in the Y-direction.)

The linear transform matrix M is then estimated by computing (ux, vx)=Tx−T0 (where Tx is the texture-coordinate of the neighboring pixel in the increasing x-direction and T0 is the texture-coordinate of the current pixel) and (uy, vy)=Ty−T0.

From this linear transform matrix M, the implicit ellipse coefficients, A, B, C, D, E and F can be found. (The implicit equation of a conic (of which an ellipse is one class) is:

$$Ax^2+Bxy+Cy^2+Dx+Ey-F=0.)$$

In this case it is assumed that the projected ellipse will be centered on the origin, so the coefficients D and E will both be equal to zero, thus giving the canonical conic:

$$Ax^2+Bxy+Cy^2=F$$

The implicit equation for this ellipse can be found by substituting $p=p'M^{-1}$ into the identity $pp^T=\cos^2 t+\sin^2 t=1$:

$$p'M^{-1}M^{-1^T}p'^T=1$$

$$p'Qp'^T=1$$

where $$Q = M^{-1}M^{-1^T} =$$

$$\frac{\begin{pmatrix} v_y & -v_x \\ -u_y & u_x \end{pmatrix}\begin{pmatrix} v_y & -u_y \\ -v_x & u_x \end{pmatrix}}{(u_x v_y - u_y v_x)^2} = \frac{\begin{pmatrix} v_x^2 + v_y^2 & -u_x v_x - u_y v_y \\ -u_x v_x - u_y v_y & u_x^2 + u_y^2 \end{pmatrix}}{(u_x v_y - u_y v_x)^2}$$

Q is the implicit conic matrix in quadratic form and is defined as:

$$pQp^T = F$$

$$(u\ v)\begin{pmatrix} A & B/2 \\ B/2 & C \end{pmatrix}\begin{pmatrix} u \\ v \end{pmatrix} = F$$

Thus, the coefficients of the implicit ellipse function can be determined as follows:

$$A=vx^2+vy^2$$

$$B=-2*(ux*vx+uy*vy)$$

$$C=ux^2+uy^2$$

$$F=(ux*vy-uy*vx)^2$$

As these basis-vectors of the ellipse (ux, vx) and (uy, vy) are not necessarily perpendicular to each-other (and there are, in fact, many different basis vectors that describe the same ellipse), in the present embodiments, a canonical set of basis vectors that correspond to the minor and major axis of the (projected) ellipse are determined (as once such canonical, orthogonal, basis-vectors have been determined, then the lengths of the minor and major axis of the ellipse will be the lengths of those vectors, respectively, and can then be used to determine the anisotropy-degree and the mip-map LOD).

The basis-vectors that correspond to the minor and major axis of the ellipse are found from the implicit ellipse coefficients A, B, C and F, by determining a new linear transform matrix M with orthogonal basis-vectors. This matrix can be written in the form:

$$M = \Lambda R = \begin{pmatrix} a & 0 \\ 0 & b \end{pmatrix}\begin{pmatrix} \cos\theta & \sin\theta \\ -\sin\theta & \cos\theta \end{pmatrix}$$

As noted above:

$$Q=M^{-1}M^{-1^T}$$

Thus in this case Q can be found as:

$$Q=M^{-1}M^{-1^T}=R^{-1}\Lambda^{-1}\Lambda^{-1^T}R^{-1^T}=R^{-1}\Lambda^{-2}R$$

since $\Lambda$ is diagonal and R is orthonormal. $\Lambda$ and R are then extracted from the conic matrix Q (which is known from the preceding calculations). To do this, the diagonal form for Q is determined:

$$Q=S^{-1}AS$$

Where A is the diagonal matrix of the eigenvalues of Q and the columns of S are the corresponding eigenvectors. The eigenvectors are chosen to have unit length, so that R=S and $\Lambda^{-2}$=A can be equated.

The eigenvalues of the 2×2 symmetric matrix Q are:

$$A = \begin{pmatrix} \lambda_1 & 0 \\ 0 & \lambda_2 \end{pmatrix} = \begin{pmatrix} (q+t)/2 & 0 \\ 0 & (q-t)/2 \end{pmatrix}$$

where $$p=A-C$$

$$q=A+C$$

$$t=sgn(p)\sqrt{p^2+B^2}$$

and $$\text{sgn}(x) = \begin{cases} -1 & x < 0 \\ +1 & x \geq 0 \end{cases}$$

When t≠0, The unit eigenvectors of Q are the columns of $$S = \begin{pmatrix} \sqrt{\frac{t+p}{2t}} & \text{sgn}(Bp)\sqrt{\frac{t-p}{2t}} \\ -\text{sgn}(Bp)\sqrt{\frac{t-p}{2t}} & \sqrt{\frac{t+p}{2t}} \end{pmatrix}$$

The eigenvectors of M are then given by $\Lambda=A^{-1/2}$:

$$a, b = \lambda_1^{-1/2}, \lambda_2^{-1/2} = \sqrt{\frac{2}{q \pm t}}$$

This means that the matrix M can be found as:

$$M = \begin{pmatrix} u_x & v_x \\ u_y & v_y \end{pmatrix} = \Lambda R$$

$$= \begin{pmatrix} \sqrt{\frac{2}{q+t}} & 0 \\ 0 & \sqrt{\frac{2}{q-t}} \end{pmatrix} \begin{pmatrix} \sqrt{\frac{t+p}{2t}} & \text{sgn}(Bp)\sqrt{\frac{t-p}{2t}} \\ -\text{sgn}(Bp)\sqrt{\frac{t-p}{2t}} & \sqrt{\frac{t+p}{2t}} \end{pmatrix}$$

$$= \begin{pmatrix} \sqrt{\frac{t+p}{t(q+t)}} & \text{sgn}(Bp)\sqrt{\frac{t-p}{t(q+t)}} \\ -\text{sgn}(Bp)\sqrt{\frac{t-p}{t(q-t)}} & \sqrt{\frac{t+p}{t(q-t)}} \end{pmatrix}$$

Where $p = A - C$ $q = A + C$ $t = \text{sgn}(p)*\text{sqrt}(p^2 + B^2)$

This matrix M assumes that F=1, but as noted above, F is in fact: $F = (u_x * v_y - u_y * v_x)^2$.

Because of this, the matrix M is multiplied with F to find the actual correctly scaled orthogonal basis vectors for the ellipse:

$ux' = F*\text{sqrt}((t+p)/(t*(q+t)))$ $vx' = F*\text{sgn}(B*p)*\text{sqrt}((t-p)/(t*(q+t)))$ $uy' = -F*\text{sgn}(B*p)*\text{sqrt}((t-p)/(t*(q-t)))$ $vy' = F*\text{sqrt}((t+p)/(t*(q-t)))$ This can be seen as an orthogonalized set of derivative vectors.

From this it can be seen that the length of the vectors are:

$lx = \text{sqrt}(ux'^2 + vx'^2) = F*\text{sqrt}(((t+p)/(t*(q+t))) + ((t-p)/(t*(q+t)))) = F*\text{sqrt}(2/(q+t))$ $ly = \text{sqrt}(uy'^2 + vy'^2) = F*\text{sqrt}(((t-p)/(t*(q-t))) + ((t+p)/(t*(q-t)))) = F*\text{sqrt}(2/(q-t))$ The anisotropy degree is aniso_degree = major_axis_radius/minor_axis_radius To determine this, it is determined which of lx and ly are the major and minor axis. It is known that q must be positive and t can be either positive or negative. If t is positive, then ly must be the major axis and lx must be the minor axis. If t is negative then lx must be the major axis and ly must be the minor axis. Thus, it can be defined:

$T = \text{abs}(t) = \text{sqrt}(p^2 + B^2)$ major_axis_radius = $F*\text{sqrt}(2/(q-T))$ minor_axis_radius = $F*\text{sqrt}(2/(q+T))$ The anisotropy degree is then determined as:

anisotropy_degree = $\text{sqrt}((q+T)/(q-T))$

And the level-of-detail (LOD) is determined as:

LOD = log 2(minor_axis_radius) = log $2(F*\text{sqrt}(2/(q+T)))$ = log $2(F) + 0.5 - 0.5*\log 2(q+T)$ The so-determined "raw" anisotropy degree and level of detail will then be used in the manner discussed above for the present embodiments to determine the mipmap levels to sample, the number of samples to take in each mipmap level along the anisotropy direction, whether supersampling is to be used, etc.

Other arrangements would, of course, be possible.

It will be appreciated from the above that the technology described herein, in its embodiments at least, can provide improved techniques for anisotropic filtering that can, for example, reduce the processing burden when performing anisotropic filtering and/or provide improved (e.g. visual) output quality when performing anisotropic filtering. This is achieved, in the embodiments of the technology described herein at least, by varying the number of positions that are sampled in each mipmap level, and/or the number of samples that are taken for each position to be sampled along the anisotropy direction.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of performing anisotropic filtering when sampling a texture to provide an output sampled texture value for use when rendering an output in a graphics processing system, the method comprising:
   when sampling a texture that is provided as two or more mipmaps using anisotropic filtering to provide an output sampled texture value:
   determining a pair of mipmap levels, comprising a first, more detailed mipmap level, and a second, less detailed mipmap level, from which to take samples to provide the output sampled texture value;
   determining an anisotropy direction along which to take one or more samples in the determined two mipmap levels;
   taking samples for a first number of positions along the anisotropy direction in the more detailed mipmap level;
   taking samples for a second, smaller number of one or more positions along the anisotropy direction in the less detailed mipmap level;
   and
   using the samples taken along the anisotropy direction in the more detailed mipmap level and the sample or samples taken along the anisotropy direction in the less detailed mipmap level to provide an output sampled texture value for use.

2. The method of claim 1, wherein twice as many positions are sampled in the more detailed mipmap level than in the less detailed mipmap level.

3. The method of claim 1, wherein the number of positions that are sampled in each mipmap level is such that the spacing between the positions along the anisotropy direction in the mipmap level corresponds to the spacing between texels in the mipmap level.

4. The method of claim 1, wherein:
the two mipmap levels to sample from are determined based on a level of detail at which the texture is to be sampled; and
the number of positions along the anisotropy direction for which to take samples in the more and less detailed mipmap levels is determined based, at least in part, on the level of detail that is used to determine the mipmap levels to sample.

5. The method of claim 1, comprising:
determining a base number of positions along the anisotropy direction for which to take samples in the texture; and wherein:
the number of positions along the anisotropy direction for which to take samples in the more and less detailed mipmap levels is determined using, at least in part, the determined base number of positions along the anisotropy direction for which to take samples in the texture.

6. The method of claim 1, wherein:
a level of detail at which to sample the texture is determined from a determined raw level of detail and one or more other parameters;
and the method comprises:
determining a base number of positions along the anisotropy direction for which to take samples in the texture, comprising:
when the level of detail at which the texture to be sampled indicates sampling the texture at the same or a more detailed level of detail than the raw level of detail indicates, determining a first base number of positions along the anisotropy direction in the texture for which to take samples when performing the anisotropic filtering to sample the texture; and
when the level of detail at which the texture is to be sampled indicates sampling a less detailed version of the texture than the raw level of detail indicates, determining a second, smaller base number of one or more positions than the first number of positions along the anisotropy direction in the texture for which to take samples when performing the anisotropic filtering to sample the texture.

7. The method of claim 1, comprising taking a single sample only for each position along the anisotropy direction that is to be sampled.

8. The method of claim 1, comprising taking plural samples for each position along the anisotropy direction that is to be sampled.

9. The method of claim 1, wherein:
a level of detail at which to sample the texture is determined from a raw level of detail and one or more other parameters; and
the method comprises:
when the level of detail at which the texture to be sampled indicates sampling the texture at the same or a less detailed level of detail than the raw level of detail indicates, taking a first number of samples at each position along the anisotropy direction in the texture for which the texture is to be sampled when performing the anisotropic filtering to sample the texture; and
when the level of detail at which the texture is to be sampled indicates sampling a more detailed version of the texture than the raw level of detail indicates, taking a second, larger number of samples than the first number of samples at each position along the anisotropy direction in the texture for which the texture is to be sampled when performing the anisotropic filtering to sample the texture.

10. A method of performing anisotropic filtering when sampling a texture to provide an output sampled texture value for use when rendering an output in a graphics processing system, in which a level of detail at which to sample the texture is determined from a determined raw level of detail and one or more other parameters, and in which the anisotropic filtering process includes determining a number of positions along an anisotropy direction in the texture for which to take samples when performing the anisotropic filtering to sample the texture;
the method comprising:
when the level of detail at which the texture to be sampled indicates sampling the texture at the same or a more detailed level of detail than the raw level of detail indicates, determining a first number of positions along the anisotropy direction in the texture for which to take samples when performing the anisotropic filtering to sample the texture; and
when the level of detail at which the texture is to be sampled indicates sampling a less detailed version of the texture than the raw level of detail indicates, determining a second, smaller number of one or more positions than the first number of positions along the anisotropy direction in the texture for which to take samples when performing the anisotropic filtering to sample the texture.

11. The method of claim 10, wherein the second smaller number of positions to sample along the anisotropy direction determined in the case where the level of detail at which the texture is to be sampled indicates sampling the texture at a less detailed level of detail than the raw level of detail indicates, is based, at least in part, on a difference between the level of detail at which the texture is to be sampled and the raw level of detail.

12. The method of claim 10, wherein a parameter that is used to modify the raw level of detail is a level of detail bias that can be set in use;
and the method further comprises:
determining whether the render output generation time is exceeding a threshold time; and
when the render output generation time is exceeding a threshold time, increasing the level of detail bias in a direction so as to cause the texture to be sampled from a less detailed mipmap level or levels than was previously being sampled.

13. The method of claim 10, comprising taking a single sample only for each position along the anisotropy direction that is to be sampled.

14. The method of claim 10, comprising taking plural samples for each position along the anisotropy direction that is to be sampled.

15. The method of claim 10, wherein:
a level of detail at which to sample the texture is determined from a raw level of detail and one or more other parameters; and
the method comprises:
when the level of detail at which the texture to be sampled indicates sampling the texture at the same or a less detailed level of detail than the raw level of detail indicates, taking a first number of samples at each position along the anisotropy direction in the texture for which the texture is to be sampled when performing the anisotropic filtering to sample the texture; and when the level of detail at which the texture is to be sampled indicates sampling a more detailed version of the texture than the raw level of detail indicates, taking a second, larger number of samples than the first number of samples at each position along the anisotropy direction in the texture for which the texture is to be sampled when performing the anisotropic filtering to sample the texture.

16. The method of claim 15, wherein the second, larger number of samples to take at each position along the anisotropy direction in the case where the level of detail at which the texture is to be sampled indicates sampling the texture at a more detailed level of detail than the raw level of detail, is based, at least in part, on a difference between the level of detail at which the texture is to be sampled and the raw level of detail.

17. A method of performing anisotropic filtering when sampling a texture to provide an output sampled texture value for use when rendering output in a graphics processing system, in which a level of detail at which to sample the texture is determined from a raw level of detail and one or more other parameters, and in which the anisotropic filtering process includes determining a number of positions along an anisotropy direction in the texture for which to take samples when performing the anisotropic filtering to sample the texture;

the method comprising:

when the level of detail at which the texture to be sampled indicates sampling the texture at the same or a less detailed level of detail than the raw level of detail indicates, taking a first number of samples at each position along the anisotropy direction in the texture for which the texture is to be sampled when performing the anisotropic filtering to sample the texture; and when the level of detail at which the texture is to be sampled indicates sampling a more detailed version of the texture than the raw level of detail indicates, taking a second, larger number of samples than the first number of samples at each position along the anisotropy direction in the texture for which the texture is to be sampled when performing the anisotropic filtering to sample the texture.

18. The method of claim 17, wherein the second, larger number of samples to take at each position along the anisotropy direction in the case where the level of detail at which the texture is to be sampled indicates sampling the texture at a more detailed level of detail than the raw level of detail, is based, at least in part, on a difference between the level of detail at which the texture is to be sampled and the raw level of detail.

\* \* \* \* \*